United States Patent
Shreevastav et al.

(10) Patent No.: US 12,326,510 B2
(45) Date of Patent: Jun. 10, 2025

(54) METHODS AND PROCEDURES FOR ENHANCED ON-DEMAND DELIVERY OF POSITIONING ASSISTANCE DATA

(71) Applicant: Telefonaktiebolaget LM Ericsson (PUBL), Stockholm (SE)

(72) Inventors: Ritesh Shreevastav, Upplands Väsby (SE); Åke Busin, Sollentuna (SE); Walter Müller, Upplands Väsby (SE); Iana Siomina, Täby (SE); Antonino Orsino, Kirkkonummi (FI)

(73) Assignee: Telefonaktiebolaget LM Ericsson (Publ), Stockholm (SE)

( * ) Notice: Subject to any disclaimer, the term of this patent is extended or adjusted under 35 U.S.C. 154(b) by 339 days.

(21) Appl. No.: 17/633,776

(22) PCT Filed: Jul. 29, 2020

(86) PCT No.: PCT/SE2020/050757
§ 371 (c)(1),
(2) Date: Feb. 8, 2022

(87) PCT Pub. No.: WO2021/029810
PCT Pub. Date: Feb. 18, 2021

(65) Prior Publication Data
US 2022/0317234 A1    Oct. 6, 2022

Related U.S. Application Data

(60) Provisional application No. 62/884,838, filed on Aug. 9, 2019.

(51) Int. Cl.
*G01S 5/02* (2010.01)
*G01S 19/05* (2010.01)
(Continued)

(52) U.S. Cl.
CPC ............ *G01S 5/0236* (2013.01); *G01S 19/05* (2013.01); *H04W 4/02* (2013.01); *H04W 4/20* (2013.01)

(58) Field of Classification Search
CPC ......... H04W 64/00; H04W 4/02; H04W 8/18; H04W 76/00; H04W 48/12; H04W 4/20;
(Continued)

(56) References Cited

U.S. PATENT DOCUMENTS 10,575,226 B2 *   2/2020   Kubota et al. .... H04W 36/0083
10,616,822 B2 *   4/2020   Kubota et al. ........ H04W 48/14
(Continued)

FOREIGN PATENT DOCUMENTS

CA    3049503 C * 10/2023    ............ H04W 48/12
EP    3 481 110 A1    5/2019
(Continued)

OTHER PUBLICATIONS (CN 108234460 A) >>> Device and Method for Processing System Information (see title) (Year: 2018).*
(Continued)

*Primary Examiner* — Dung Hong
(74) *Attorney, Agent, or Firm* — Weisberg I.P. Law, P.A.

(57) ABSTRACT

According to certain embodiments, a method by a wireless device includes receiving, from a network node, a first indication of a system information data and broadcast status associated with on-demand delivery of the system information data. The wireless device transmits a request for the system information data to the network node while the wireless device is in Radio Resource Control, RRC, Connected Mode. Based on the broadcast status, the wireless device receives the on-demand delivery of the system information data from the network node.

20 Claims, 15 Drawing Sheets

(51) Int. Cl.
*H04W 4/02* (2018.01)
*H04W 4/20* (2018.01)

(58) Field of Classification Search
CPC ....... H04W 48/14; H04W 4/06; H04W 4/029;
H04W 4/021; H04W 48/10; H04W 48/08;
H04W 76/40; H04W 76/20; H04W 76/27;
H04W 76/10; H04W 88/00; H04W 88/02;
H04W 88/08; H04W 88/18; H04W 4/50;
H04W 4/30; H04W 72/23; H04W 72/30;
H04W 74/006; G01S 5/00; G01S 5/02;
G01S 19/07; G01S 19/12; G01S 5/0236;
G01S 19/05; G01S 19/04
See application file for complete search history.

(56) References Cited

U.S. PATENT DOCUMENTS

| | | | | |
|---|---|---|---|---|
| 10,880,815 | B2* | 12/2020 | Shih et al. | H04W 76/25 |
| 11,224,092 | B2* | 1/2022 | Zhang et al. | H04W 80/02 |
| 11,419,150 | B2* | 8/2022 | Wakabayashi et al. | H04W 74/0833 |
| 2013/0111520 | A1* | 5/2013 | Lo et al. | H04N 21/25841 |
| 2016/0021584 | A1* | 1/2016 | Zhang et al. | H04W 36/0083 |
| 2017/0171605 | A1* | 6/2017 | Li | H04N 21/6408 |
| 2017/0374581 | A1* | 12/2017 | Dao | H04W 28/06 |
| 2018/0013524 | A1* | 1/2018 | Chen et al. | H04L 5/005 |
| 2018/0049107 | A1 | 2/2018 | Johansson et al. | |
| 2018/0199267 | A1* | 7/2018 | Lin et al. | H04W 48/10 |
| 2018/0279377 | A1* | 9/2018 | Lin et al. | H04W 74/0833 |
| 2018/0324740 | A1 | 11/2018 | Edge et al. | |
| 2018/0324846 | A1* | 11/2018 | Mallick et al. | H04W 72/14 |
| 2019/0037338 | A1 | 1/2019 | Edge et al. | |
| 2019/0349844 | A1* | 11/2019 | Ishii | H04W 48/14 |
| 2020/0029180 | A1* | 1/2020 | Lei et al. | H04W 4/06 |

FOREIGN PATENT DOCUMENTS

| | | | |
|---|---|---|---|
| EP | 3772230 A1 * | 2/2021 | ............ H04W 74/08 |
| WO | 2019 023905 A1 | 2/2019 | |
| WO | 2019 061206 A1 | 4/2019 | |
| WO | WO 2019091584 A1 * | 5/2019 | ............. H04W 4/02 |

OTHER PUBLICATIONS (WO 2018082607 A1) >>> Base Station, User Equipment and Related Methods (see title) (Year: 2018).*
(WO 2017135042 A1) >>> Terminal Device, Base Station Device, Communications Method, and Integrated Circuit (title) (Year: 2017).*
(WO 2016141955 A1) >>> Cell Selection (see title) (Year: 2016).*
(CN 106415300 B) >>> The Location Beacon With Wireless Backhaul (see title) (Year: 2018).*
(CN 108632920 A) >>> A System Information Transmission Method and Device (see title) (Year: 2018).*
Li et al. (WO 2019157729 A1) >>> Method and Device for Sending Auxiliary Data (see title) (Year: 2019).*
Thienot Cedric et al. (FR 3052318 A1)—Method for Accessing a Service Transmitted in Tele-Broadcast Mode on a Mobile Network (see title) (Year: 2017).*
3GPP TSG-RAN WG2 #108; Reno, USA; Source: Ericsson; Title: On Demand Delivery of Positioning Assistance Data (R2-1915656)—Nov. 18-22, 2019.
3GPP TSG-RAN meeting #84; Newport Beach, USA; Status Report to TSG; Title: Status report of WI: NR positioning support (RP-191155)—Jun. 3-6, 2019.
3GPP TSG-SA WG2 Meeting #133; Reno, NV, USA; Source: Ericsson; Title: Distribution of Assistance Data broadcast keys using MO-LR (S2-1905054 (revision of S2-190xxxx))—May 13-17, 2019.
PCT International Search Report issued for International application No. PCT/SE2020/050757—Dec. 17, 2020.
PCT Written Opinion of the International Searching Authority issued for International application No. PCT/SE2020/050757—Dec. 17, 2020.

* cited by examiner

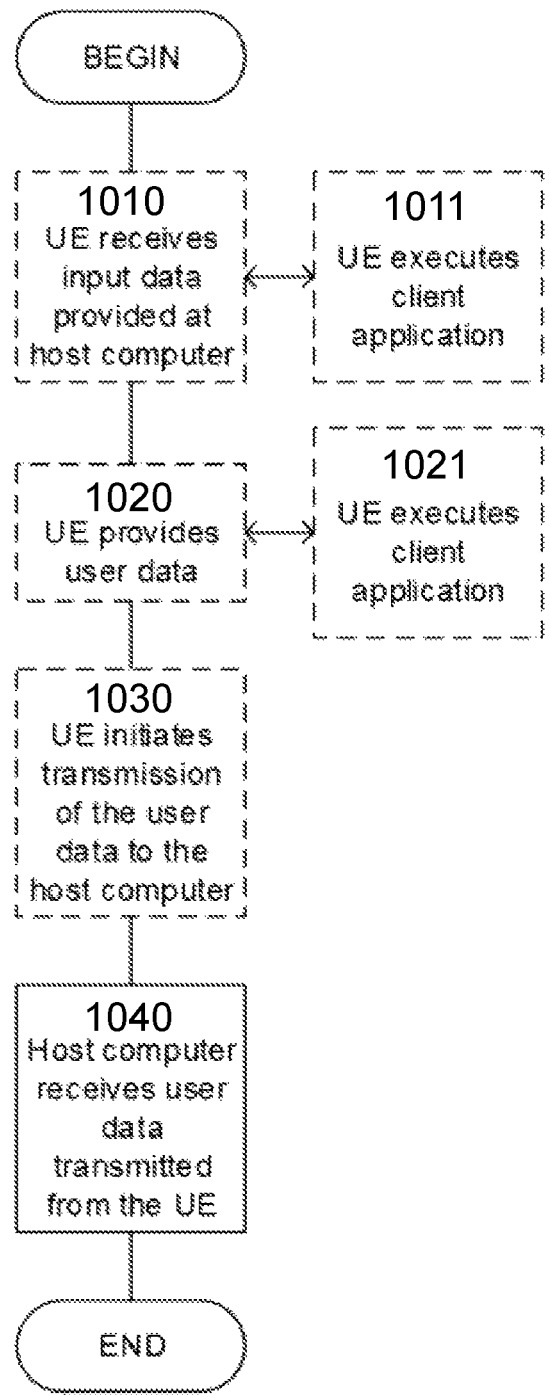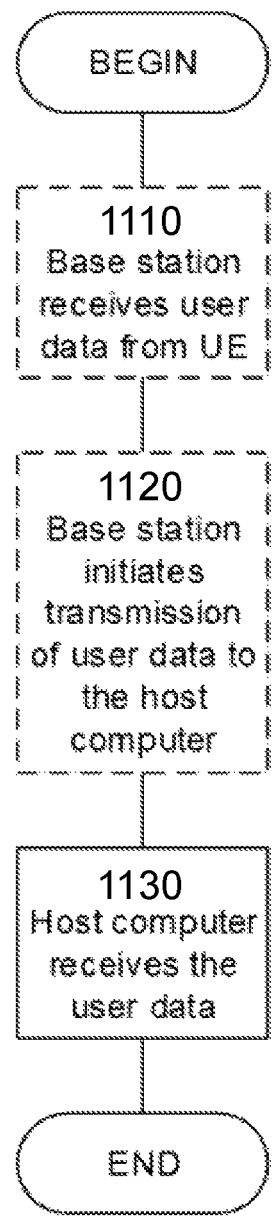
FIGURE 12
FIGURE 13

METHODS AND PROCEDURES FOR ENHANCED ON-DEMAND DELIVERY OF POSITIONING ASSISTANCE DATA

PRIORITY

This nonprovisional application is a U.S. National Stage Filing under 35 U.S.C. § 371 of International Patent Application Serial No. PCT/SE2020/050757 filed Jul. 29, 2020 and entitled "Methods and Procedures for Enhanced On-Demand Delivery of Positioning Assistance Data", which claims priority to U.S. Provisional Patent Application No. 62/884,838 filed Aug. 9, 2019 both of which are hereby incorporated by reference in their entirety.

TECHNICAL FIELD

The present disclosure relates, in general, to wireless communications and, more particularly, systems, methods, and procedures for enhanced on-demand delivery of positioning assistance data.

BACKGROUND

User Equipment (UE) positioning is recognized as an important feature for Long-Term Evolution (LTE) and $5^{th}$ Generation (5G) networks due to its potential for massive commercial applications such as, for example, intelligent transportation, entertainment, industry automation, robotics, remote operation, healthcare, smart parking and so on), as well as for its relevance to US FCC E911 requirements.

Positioning in LTE is supported by an architecture with direct interactions between a UE and a location server such as an Evolved-Serving Mobile Location Center (E-SMLC) via the LTE Positioning Protocol (LPP). Moreover, there are also interactions between the location server and the eNodeB via the LPPa protocol, to some extent supported by interactions between the eNodeB (eNB) and the UE via the Radio Resource Control (RRC) protocol.

The following positioning techniques are considered in LTE:
- Enhanced Cell Identifier: Essentially, cell identifier (cell ID) information is used to associate the UE to the serving area of a serving cell, and then additional information is used to determine a finer granularity position.
- Assisted Global Navigation Satellite System (GNSS): GNSS information is retrieved by the UE, supported by assistance information provided to the UE from E-SMLC.
- Observed Time Difference of Arrival (OTDOA): The UE estimates the time difference of reference signals from different base stations and sends the time difference to the E-SMLC for multilateration.
- Uplink Time Difference of Arrival (UTDOA): The UE is requested to transmit a specific waveform that is detected by multiple location measurement units (e.g., an eNB) at known positions. These measurements are forwarded to E-SMLC for multilateration.

Recent enhancements in GNSS technology include Real Time Kinematic (RTK) GNSS, which is a differential GNSS positioning technology that enables positioning accuracy improvement from metre level to decimetre or even centimetre level in real-time by exploiting the carrier phase of the GNSS signal rather than only the code phase. Support for RTK GNSS in LTE networks should therefore be provided and are under standardization in the Release 15 work item.

The support for RTK in LTE networks comprises providing RTK correction data as part of positioning assistance data to the UE via LPP. Three provisioning means of positioning assistance data to the UE are supported:
- Unicast via a user plane connection,
- Unicast via a control plane connection, and
- Broadcast via system information broadcast.

Broadcast provisioning would be supported by New Radio (NR) devices. Thus, NR broadcast is also a plausible enhancement that can potentially be specified.

For broadcast, there can be multiple System Information Blocks (SIBs) that may be needed to be transmitted as listed below.

RTK is one of the Positioning assistance data (AD) that needs to be supported in 3rd Generation Partnership Project (3GPP) Release-15. This can be divided into common or generic message type. Common messages are not associated with GNSS-ID, whereas Generic messages are associated with GNSS-ID. Common assistance data may include GNSS-RTK-ReferenceStationInfo, GNSS-RTK-Common-ObservationInfo, and/or GNSS-RTK-AuxiliaryStationData. Generic message Data may include GNSS-RTK-Observations, GLO-RTK-BiasInformation for GLONASS, GNSS-RTK-MAC-CorrectionDifferences, GNSS-RTK-Residuals, GNSS-RTK-FKP-Gradients, GNSS-SSR-OrbitCorrections, GNSS-SSR-ClockCorrections, and/or GNSS-SSR-CodeBias.

Observed Time Difference of Arrival (OTDOA) specific information (Assistance Data) also needs to be broadcasted as shown in below Table 1 of 3GPP TS 36.355 355 v15.1.0.

There currently exist certain challenge(s). For example, the problem with the current procedures for periodic positioning assistance data provisioning via broadcast is that it would consume high amount of resources (i.e, Time-Frequency grid, subframes, etc.) to broadcast the large number of positioning SIBs. In NR, there is possibility to broadcast the SIBs based upon UE request. Thus, when there are no users which require the SIBs, the base station stops the transmission.

The Positioning SIBs (posSIBs) are, however, prepared by location server and updated also by location server. The similar on-demand System Information Block (SIB) broadcast may not work well for Positioning SIBs. The positioning SIB broadcast functionality is distributed between the base station and location server. A solution should not disrupt the functionality of each node. Further, positioning SIBs are value added service and broadcast is mainly considered for scaling reasons. Thus, the network may provide a unicast solution and later decide to switch to broadcast when there are enough users where broadcast is deemed beneficial. Considering these aspects, the RRC based on demand SI may not work for Positioning SIBs.

Further, as seen from Table 1, there are many posSIBs, and the network node may not support all of the posSIBs. However, a UE may not realize which posSIBs may be obtained through on demand unicast and which posSIBs may not be obtained through on demand unicast.

SUMMARY

Certain aspects of the present disclosure and their embodiments may provide solutions to these or other challenges. For example, certain embodiments may provide assistance data delivery by using an on demand unicast procedure. Specifically, a mechanism may be provided whereby a base station may inform the UE that on demand delivery of data is supported by using a unicast procedure.

According to certain embodiments, a method by a wireless device includes receiving, from a network node, a first indication of a system information data and broadcast status associated with on-demand delivery of the system information data. The wireless device transmits, to the network node, a request for the system information data while the wireless device is in Radio Resource Control (RRC) Connected Mode. Based on the broadcast status, the wireless device receives the on-demand delivery of the system information data from the network node.

According to certain embodiments, a wireless device includes a memory operable to store instructions and processing circuitry operable to execute the instructions to cause the wireless device to: receive, from a network node, a first indication of a system information data and broadcast status associated with on-demand delivery of the system information data; transmit, to the network node, a request for the system information data and while in RRC Connected mode; and based on the broadcast status, receive the on-demand delivery of the system information data from the network node.

According to certain embodiments, a method by a network node includes transmitting, to a wireless device, a first indication of system information data and a broadcast status associated with on-demand delivery of the system information data. The network node receives, from the wireless device, a request for the system information data while the wireless device is in RRC Connected mode. Based on the broadcast status, the network node transmits the on-demand delivery of the system information data to the wireless device in RRC Connected mode.

According to certain embodiments, a network node includes a memory operable to store instructions and processing circuitry operable to execute the instructions to cause the wireless device to: transmitting, to a wireless device, a first indication of system information data and a broadcast status associated with on-demand delivery of the system information data; receiving, from the wireless device, a request for the system information data while the wireless device is in RRC Connected mode; and based on the broadcast status, transmitting the on-demand delivery of the system information data to the wireless device in RRC Connected mode.

Certain embodiments may provide one or more of the following technical advantage(s). For example, certain embodiments may enhance the current On demand System Information (SI) solution for RRC broadcast when position System Information Blocks (posSIBs) are introduced for the framework. As another example, certain embodiments may provide an opportunity for the network to inform the wireless device of posSIBs that are supported and/or posSIBs that are not supported. As another example, certain embodiments may provide opportunity for the network to inform the wireless device that the wireless device should obtain certain information only by means of unicast. As still another example, certain embodiments may provide a mechanism to utilize network resources more efficiently.

Other advantages may be readily apparent to one having skill in the art. Certain embodiments may have none, some, or all of the recited advantages.

BRIEF DESCRIPTION OF THE DRAWINGS

For a more complete understanding of the disclosed embodiments and their features and advantages, reference is now made to the following description, taken in conjunction with the accompanying drawings, in which:

FIG. 12 illustrates another method implemented in a communication system, according to one embodiment;

FIG. 13 illustrates another method implemented in a communication system, according to one embodiment;

DETAILED DESCRIPTION

Figure 1:
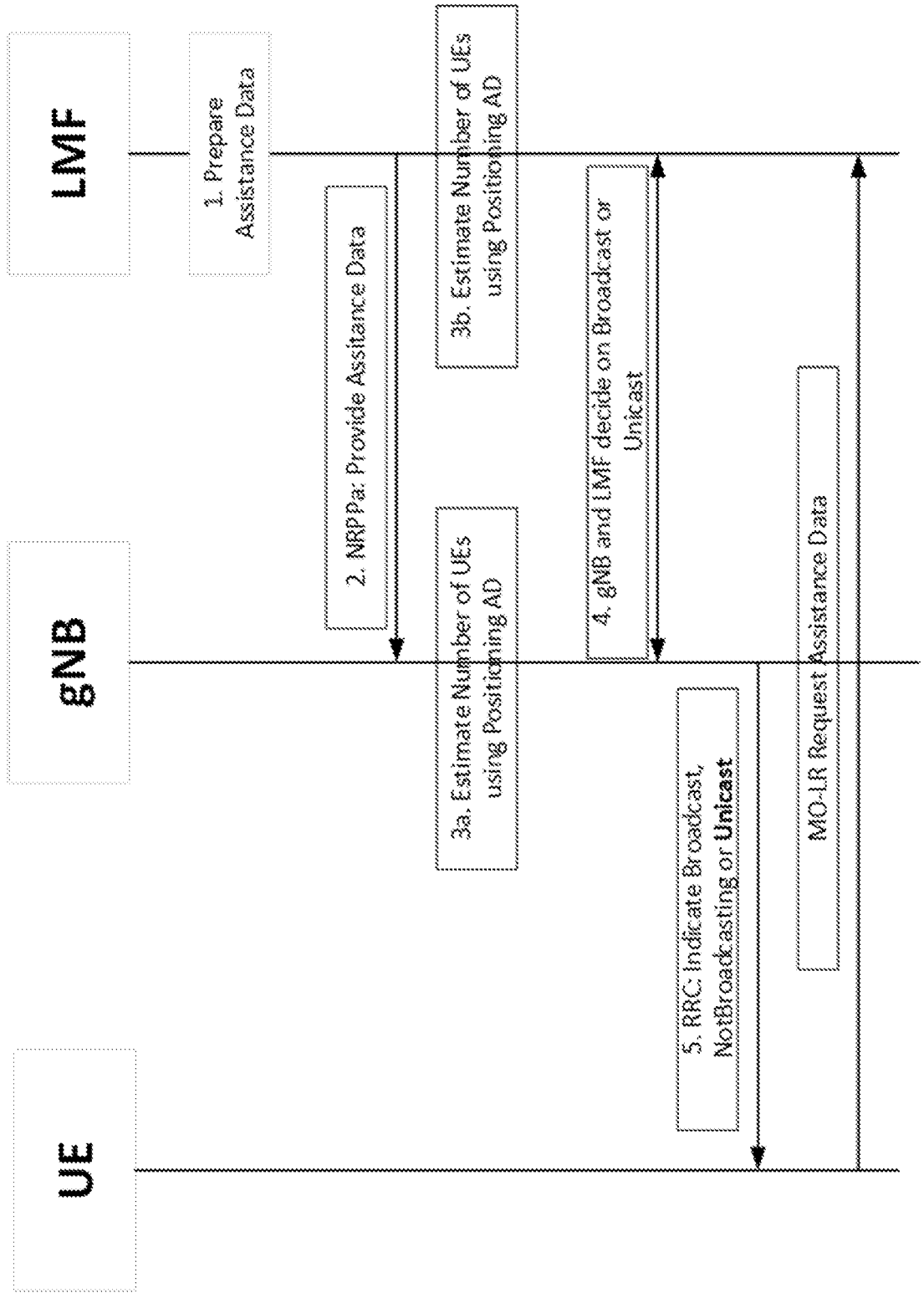
FIG. 1 illustrates an example signaling diagram wherein a wireless device invokes a MO-LR procedure when the network specifies unicast only, according to certain embodiments.

Generally, all terms used herein are to be interpreted according to their ordinary meaning in the relevant technical field, unless a different meaning is clearly given and/or is implied from the context in which it is used. All references to a/an/the element, apparatus, component, means, step, etc. are to be interpreted openly as referring to at least one instance of the element, apparatus, component, means, step, etc., unless explicitly stated otherwise. The steps of any methods disclosed herein do not have to be performed in the exact order disclosed, unless a step is explicitly described as following or preceding another step and/or where it is implicit that a step must follow or precede another step. Any feature of any of the embodiments disclosed herein may be applied to any other embodiment, wherever appropriate. Likewise, any advantage of any of the embodiments may apply to any other embodiments, and vice versa. Other objectives, features and advantages of the enclosed embodiments will be apparent from the following description.

Certain embodiments may include functionality for methods and procedures for enhanced on-demand delivery of positioning assistance data (AD). According to certain embodiments, for example, mechanism(s) may be provided whereby a network node, such as a base station, can inform a wireless device, such as a user equipment (UE), that on demand delivery of data shall be supported by using a unicast procedure.

According to certain embodiments, a location server may determine which positioning System Information Blocks (posSIBs) are supported and which are not. In a particular embodiment, the location server may provide a list of supported and/or unsupported posSIBs to the base station (or other network node). The base station (or other network node) may then inform the wireless device of which posSIBs are supported and/or which posSIBs are not supported.

According to certain embodiments, a base station such as, for example, a gNodeB (gNB) or other network node, and/or location server may decide how to deliver the data, which may include Positioning Assistance Data, depending upon various factors such as data update rate, number of users requiring the service, security protection need, and/or other suitable factors.

According to certain embodiments, a base station or other network node may toggle among different broadcast status, such as between "broadcasting," "not broadcasting," and "unicast." For example, a base station may toggle from "broadcasting" to "not broadcasting." As another example, a base station may toggle from "not broadcasting" to "unicast."

According to certain embodiments, the interpretation of broadcast status is extended to indicate unicast. A broadcast status can be expressed in BIT STRING or ENUMERATED field which represents the posSIBType defined in TABLE 1, discussed above. The broadcast status BIT STRING informs whether wireless device may obtain certain assistance data type using unicast.

According to certain embodiments, a first cell or base station or other network node may inform a second cell or base station or other network node (e.g., via X2/Xn) or location server which parts of assistance data are provided via unicast and/or broadcast.

According to certain embodiments, a base station or other network node may inform a wireless device, such as a UE, that on demand delivery is supported using unicast Mobile Originated-Location Request (MO-LR) or Signaling Radio Bearer (SRB).

According to certain embodiments, a wireless device such as a UE may indicate (e.g., via a request or in an unsolicited way) to a base station, location server, or other network node that it supports the procedure for obtaining the on-demand assistance data content via unicast.

According to certain embodiments, a wireless device, such as a UE, for example, may initiate a procedure such as, for example, a RRC Setup Request or MO-LR procedure to obtain the on-demand assistance data content. In a particular embodiment, the UE may additionally or alternatively indicate which data it is interested in.

According to certain embodiments, a base station or other network node may deliver on-demand assistance data content to a wireless device supporting this procedure.

According to certain embodiments, a wireless device such as UE may receive on-demand assistance data content from the base station.

In further embodiments, at handover, one or more of the below may apply:
 a new cell is informed by the old cell or location server about the UEs capability to support on-demand assistance data delivery via unicast,
 a new cell is informed by the old cell or location server about the UEs interest or current configuration in the old cell related to receiving the on-demand assistance data delivery via unicast,
 if the new cell supports the on-demand assistance data delivery via unicast it can provide it to the UE without a new request from the UE in the new cell but based on the information from the old cell
 after handover, the UE may continue receiving on-demand assistance data via unicast without performing in the new cell all steps of the initiating procedure When the UE is in dual or multi-connectivity operation mode, providing the overlapping parts of assistance data via multiple serving cells is avoided by the network and/or by the UE.

Further, for UEs in RRC_CONNECTED, posSIBs may be requested via dedicated Radio Resource Control (RRC) signaling, where the used RRC message may be:
 New RRC messages used to request positioning SIBs such as, for example, a posUEInformationRequest. This message may be eventually used also for other procedures that are positioning-related.
 Existing RRC message used to forward UE information to the network (e.g., UEAssistanceInformation).
 Existing RRC message(s) generally used for procedures non related to positioning (e.g., ULInformationTransfer).

Once the network receives the request from the UE for on demand assistance data content, this is delivered back to the UE via the existing procedure for delivering SIBs in a dedicated RRC procedure such as, for example, via RRCReconfiguration message. However, also new RRC messages may be specified to enable the directly forwarding of on demand data content to UEs such as, for example, posUEInformation.

Certain embodiments may be MO-LR based. For example, FIG. 1 illustrates an example signaling diagram wherein a wireless device, such as a UE 105, invokes a MO-LR procedure when the network specifies unicast only, according to certain embodiments. As illustrated a Location Management Function (LMF) 110 prepares assistance at step 1 and initiates a NR Positioning Protocol A (NRPPa) procedure for providing assistance data at step 2. The gNodeB (gNB) 115 and the LMF 110 estimate the number of UEs using positioning assistance data (AD) at steps 3a and 3b, respectively. At step 4, the gNB 115 and LMF 110 decide on broadcast or unicast. At step 5, the gNB 115 indicates broadcast, not broadcast, or unicast to the UE 105. At step 6, the UE 105 sends a MO-LR request for AD.

RRC On demand System Information (SI) framework is dependent upon the below parameter si-BroadcastStatus. This parameter Indicates if the SI message is being broadcasted or not:
 si-BroadcastStatus ENUMERATED {broadcasting, not-Broadcasting}

From UE perspective, if an SI indication is broadcasting, the UE can identify the particular SI scheduling information from SIB1 and read the SI content at the scheduled occasion accordingly. However, if an SI is not being broadcasted, it can request to the base station by initiating the Random-Access (RA) procedure. Thus, even when a single UE demands the SI, the broadcast has to be enabled.

For positioning, the broadcast is more seen for scaling purpose when there are several UEs which require the same content. However, if there are not enough UEs requiring the service, unicast is always considered efficient because of higher data rate, low latency, from security perspective integrity protection etc.

According to a certain embodiments, one or more network nodes (base station and/or Location Server) may decide whether to provide the data by means of unicast or by means of broadcast. In a particular embodiment, for example, the network nodes may decide whether to provide the data by means of unicast or broadcast based upon a threshold for a number of devices requiring position data content.

In a particular embodiment, the number of devices can be dynamically updated or upon triggering by, e.g., UEs leaving the cell or new UE entering the cell or configuring/deconfiguring new serving cells in a UE. Further, the network node may toggle between unicast and broadcast depending upon whether the threshold condition is above or below the threshold.

In a particular embodiment, the broadcast status may be set to unicast only. Thus, this new enum may be introduced:

si-BroadcastStatus ENUMERATED {broadcasting, not-Broadcasting, unicast}

In a particular embodiment, the UE may invoke the MO-LR or Secure User Plane Location (SUPL) procedure to request the certain posSIB content as highlighted in 3GPP TS 23.271 and OMA-AD-SUPL-V2_0, respectively. In downlink (DL), UE shall receive the assistance data using LTE Positioning Protocol (LPP)/SUPL dedicated signalling.

The UE behaviour is further captured in the below proposed revision of the 3GPP 38.331 procedure:

2.2.3.3 Request for on Demand System Information

The UE shall:

1>if SIB1 includes si-SchedulingInfo containing si-RequestConfig or si-RequestConfigSUL:
  2>trigger the lower layer to initiate the Random Access procedure in accordance with [3] using the Physical Random Access Channel (PRACH) preamble(s) and PRACH resource(s) in si-RequestConfig or si-RequestConfigSUL corresponding to the SI message(s) that the UE requires to operate within the cell, and for which si-BroadcastStatus is set to notBroadcasting;
  2>if acknowledgement for SI request is received from lower layers:
    3>acquire the requested SI message(s) as defined in sub-clause 5.2.2.3.2, immediately;
1>else if SIB1 includes si-SchedulingInfo containing si-RequestConfig and criteria to select normal uplink as defined in TS 38.321[13], clause 5.1.1 is met:
  2>trigger the lower layer to initiate the random access procedure on normal uplink in accordance with TS 38.321 [3] using the PRACH preamble(s) and PRACH resource(s) in si-RequestConfig corresponding to the SI message(s) that the UE requires to operate within the cell, and for which si-BroadcastStatus is set to notBroadcasting;
  2>if acknowledgement for SI request is received from lower layers:
    3>acquire the requested SI message(s) as defined in sub-clause 5.2.2.3.2, immediately;
1>else
  2>apply the timeAlignmentTimerCommon included in SIB1;
  2>apply the CCCH configuration as specified in 9.1.1.2;
  2>initiate transmission of the RRCSystemInfoRequest message in accordance with 5.2.2.3.4;
  2>if acknowledgement for RRCSystemInfoRequest message is received from lower layers:
    3>acquire the requested SI message(s) as defined in sub-clause 5.2.2.3.2, immediately;
1>if cell reselection occurs while waiting for the acknowledgment for SI request from lower layers:
  2>reset MAC;
  2>if SI request is based on RRCSystemInfoRequest message:
    3>release RLC entity for SRB0.
  1>if SIB1 includes si-PosSchedulingInfo containing si-PosRequestConfig and in si-PosRequestConfig corresponding to the SI message(s) that the UE requires to operate within the cell, and for which si-BroadcastStatus is set to unicast;
    2>trigger to initiate the MO-LR procedure in accordance with [TS 23.271]

NOTE: After RACH failure for SI request it is UE implementation when to retry the SI request.

In a particular embodiment, the MO-LR message may be extended to include the on-demand delivery request for certain posSIB (assistance data type). In a particular embodiment, it may be in terms of a BIT STRING, indicating which posSIB the wireless device requires.

For Positioning a separate si-schedulingInfo, si-RequestConfig is introduced (si-PosschedulingInfo, si-PosRequestConfig) to distinguish from legacy. Further, the positioning SIB scheduling info can be hosted in other SIB than SIB1; in such case, the above addition would reflect that SIB number instead of SIB1.

Certain embodiments may include a RRC based procedure. This procedure may be an alternate embodiment to the MO-LR based procedure described above.

Figure 2:
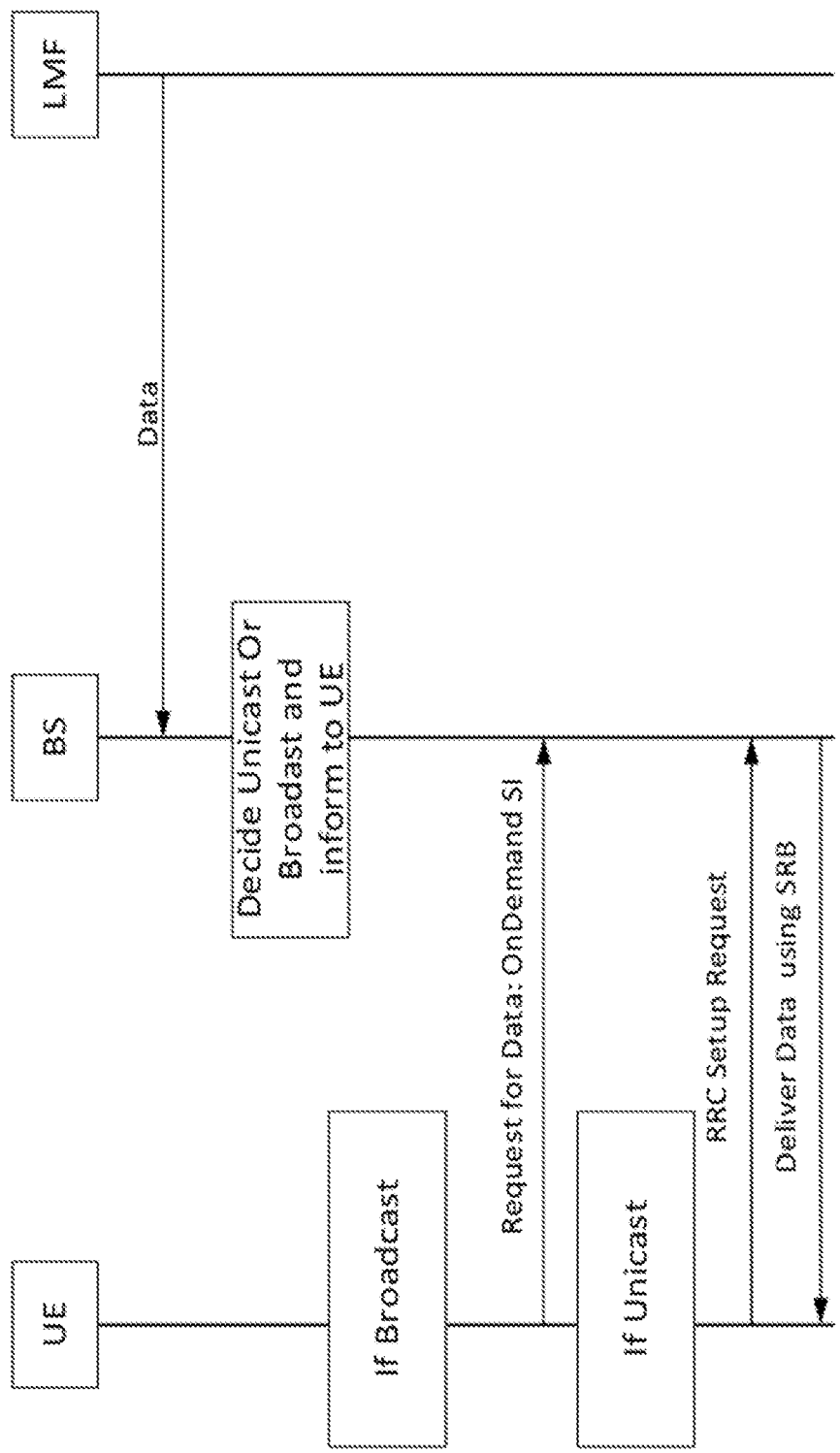
FIG. 2 illustrates an example signaling diagram for a posSIB content unicast delivery mechanism, according to certain embodiments.

FIG. 2 illustrates an example signaling diagram for a posSIB content unicast delivery mechanism, according to certain embodiments. Specifically, FIG. 2 illustrates signaling between a UE 205, an LMF 210, and a base station (BS) 215. At step 1, the LMF 210 sends data to BS 215.

As illustrated in FIG. 2, according to certain embodiments, a network node such as base station (BS) 215 may decide whether to deliver assistance data using either broadcast or unicast, at step 2. The decision may be primarily based upon the nature of data (update rate, number of Users demanding the same content, security need). If broadcast, the UE 205 sends a request for data via OnDemand SI, at step 3a. Alternatively, if unicast, the UE 205 sends a RRCSetup Request at step 3b.

In the case of unicast, particular embodiments may use a Signalling radio bearer (SRB) to transmit by unicast the data, at step 4. The SRB can be a low priority SRB. In another particular embodiment, a Msg4 such as RRC Connection Setup/Release/Resume may be used to deliver the data or RRCReconfiguration message can be used.

The UE behaviour is further captured in the below revision of the 3GPP 38.331 procedure:

5.2.2.3.3 Request for on Demand System Information

The UE shall:

1>if SIB1 includes si-SchedulingInfo containing si-RequestConfigSUL and criteria to select supplementary uplink as defined in TS 38.321[13], clause 5.1.1 is met:

2>trigger the lower layer to initiate the Random Access procedure on supplementary uplink in accordance with [3] using the PRACH preamble(s) and PRACH resource(s) in si-RequestConfigSUL corresponding to the SI message(s) that the UE requires to operate within the cell, and for which si-BroadcastStatus is set to notBroadcasting;

2>if acknowledgement for SI request is received from lower layers:

3>acquire the requested SI message(s) as defined in sub-clause 5.2.2.3.2, immediately;

1>else if SIB1 includes si-SchedulingInfo containing si-RequestConfig and criteria to select normal uplink as defined in TS 38.321[13], clause 5.1.1 is met:

2>if si-BroadcastStatus is set to notBroadcasting trigger the lower layer to initiate the random access procedure on normal uplink in accordance with TS 38.321 [3] using the PRACH preamble(s) and PRACH resource(s) in si-RequestConfig corresponding to the SI message(s) that the UE requires to operate within the cell;

2>if acknowledgement for SI request is received from lower layers:

3>acquire the requested SI message(s) as defined in sub-clause 5.2.2.3.2, immediately;

2>if si-BroadcastStatus is set to unicast initiate transmission of the RRCSetupRequest message in accordance with 5.3.3.3 with establishment cause si-Request and corresponding to the SI message(s) that the UE requires to operate within the cell;

1>else:

2>apply the timeAlignmentTimerCommon included in SIB1;

2>apply the CCCH configuration as specified in 9.1.1.2;

2>initiate transmission of the RRCSystemInfoRequest message in accordance with 5.2.2.3.4;

2>if acknowledgement for RRCSystemInfoRequest message is received from lower layers:

3>acquire the requested SI message(s) as defined in sub-clause 5.2.2.3.2, immediately;

1>if cell reselection occurs while waiting for the acknowledgment for SI request from lower layers:

2>reset MAC;

2>if SI request is based on RRCSystemInfoRequest message:

3>release RLC entity for SRB0.

NOTE: After RACH failure for SI request it is up to UE implementation when to retry the SI request.

According to certain embodiments, in order to realize this, a new RRCSetupRequest message may be defined, which is herein called as RRCSystemInfoRequestPos.

5.2.1.1 UL-CCCH-Message

The UL-CCCH-Message class is the set of 48-bits RRC messages that may be sent from the UE to the Network on the uplink CCCH logical channel.

```
-- ASN1START
-- TAG-UL-CCCH-MESSAGE-START
UL-CCCH-Message ::=       SEQUENCE {
    message                   UL-CCCH-MessageType
}
```

```
UL-CCCH-MessageType ::=   CHOICE {
    c1                             CHOICE {
        rrcSetupRequest                RRCSetupRequest,
        rrcResumeRequest               RRCResumeRequest,
        rrcReestablishmentRequest      RRCReestablishmentRequest,
        rrcSystemInfoRequest           RRCSystemInfoRequest
    },
    c2                             CHOICE {
        posSystemInfoRequest           RRCSystemInfoRequestPos,
        messageClassExtension          SEQUENCE { }
    },
    messageClassExtension      SEQUENCE { }
}
-- TAG-UL-CCCH-MESSAGE-STOP
-- ASN1STOP
RRCSystemInfoRequestPos-IEs ::=   SEQUENCE {
    ue-Identity                       InitialUE-Identity,
    posSI-Request                     BIT STRING (SIZE (5))
}
```

If the UL-CCCH1-Message is used, it has more bits available; up to 64-bits; thus there is possibility to increase the number of posSI-Request bits 5.2.1.2 UL-CCCH1-Message The UL-CCCH1-Message class is the set of 64-bits RRC messages that may be sent from the UE to the Network on the uplink CCCH1 logical channel.

```
-- ASN1START
-- TAG-UL-CCCH1-MESSAGE-START
UL-CCCH1-Message ::=      SEQUENCE {
    message                   UL-CCCH1-MessageType
}
UL-CCCH1-MessageType ::=  CHOICE {
    c1                             CHOICE {
        rrcResumeRequest1              RRCResumeRequest1,
        posSystemInfoRequest           RRCSystemInfoRequestPos,
        spare2 NULL,
        spare1 NULL
    },
    messageClassExtension SEQUENCE { }
}
-- TAG-UL-CCCH1-MESSAGE-STOP
-- ASN1STOP
RRCSystemInfoRequestPos-IEs ::=   SEQUENCE {
    ue-Identity                       InitialUE-Identity,
    posSI-Request                     BIT STRING (SIZE (20))
}
```

Here, and according to certain embodiments, poSI-Request may be preferred instead of posSIB because posSIB are large in number and may be difficult to fit within the available bit. Thus, the mapping between SI and SIB may be provided by the network via system information that the wireless device can use to determine which SI to request. Further, if posSIB is used then a special BIT STRING may be used to denote for which posSIBType the BIT STRING is applicable. This can be extracted based upon supported posSIB-Unicast BIT STRING or can be subset of posSIB defined in Table 1. In an example, it may simply be Master Auxiliary Concept (MAC), Area Correction Parameters (i.e., Flächenkorrekturparameter (FKP)) or State Space Representation (SSR); consisting of three flag bits flags. Thus, when UE asks for MAC, Network provides all the dynamic or varying assistance data content related to MAC.

```
-- ASN1START
-- TAG-OTHER-SI-INFO-START
SIBXX-Pos-r16 ::=            SEQUENCE {
    posSchedulingInfoList-r16    SEQUENCE (SIZE (1 . . maxSI-Message)) OF
PosSchedulingInfo-r16,
    posSIB-Unicast           BIT STRING (SIZE (48))    OPTIONAL,    --
Need OP
    posSI-SRB-Delivery       BOOLEAN              OPTIONAL,    --Need
OP
    . . .
}
PosSchedulingInfo-r16 ::= SEQUENCE {
    posSI-Periodicity-r16    ENUMERATED   {rf8, rf16, rf32, rf64, rf128,
rf256, rf512},
    posSIB-MappingInfo-r16   PosSIB-MappingInfo-r16
}
PosSIB-MappingInfo-r16 ::= SEQUENCE (SIZE (1 . . maxSIB)) OF PosSIB-Type-r16
PosSIB-Type-r16 ::= SEQUENCE {
    encrypted-r16   ENUMERATED { true }       OPTIONAL,    -- Need OP
    gnss-id-r16     GNSS-ID-r16               OPTIONAL,    -- Need OP
    sbas-id-r16     SBAS-ID-r16               OPTIONAL,    -- Need OP
    posSibType-r16  ENUMERATED {    posSibType1-1,
                                    posSibType1-2,
                                    posSibType1-3,
                                    posSibType1-4,
                                    posSibType1-5,
                                    posSibType1-6,
                                    posSibType1-7,
                                    posSibType2-1,
                                    posSibType2-2,
                                    posSibType2-3,
                                    posSibType2-4,
                                    posSibType2-5,
                                    posSibType2-6,
                                    posSibType2-7,
                                    posSibType2-8,
                                    posSibType2-9,
                                    posSibType2-10,
                                    posSibType2-11,
                                    posSibType2-12,
                                    posSibType2-13,
                                    posSibType2-14,
                                    posSibType2-15,
                                    posSibType2-16,
                                    posSibType2-17,
                                    posSibType2-18,
                                    posSibType2-19,
                                    posSibType3-1,
                                    . . . },
    . . .
}
-- TAG-OTHER-SI-INFO-STOP
-- ASN1STOP
```

According to certain embodiments, the wireless device may inspect the field posSIB-Unicast to determine which posSIBs are supported by the network and which the wireless device can retrieve via unicast. This field instead of unicast can also be generic representing overall which all posSIBs are supported. If certain posSIBs are already broadcasted, then UE can assume the rest of the valid/supported posSIBs are to be obtained by means of unicast only.

Further, it can then evaluate which procedure it should apply for unicast to obtain that using the field posSI-SRB-Delivery; is it through either LMF node using LPP protocol or using gNB via RRC protocol. The advantage of using RRC is that it can have lower latency compared to LPP. According to certain embodiments, the network node may decide whether it wants MO-LR or RRC based. Further, this can be dependent upon LMF and gNB capability. For instance, if gNB supports Assistance Data delivery using SRB, a parameter such as srb-Delivery can be used and it can be set to true. Upon the parameter being set to true, the UE may use RRC mechanism. Conversely, if the parameter is set to false or other than true, the UE may use the MO-LR mechanism. It could be that the UE does not support MO-LR procedure; in such case, UE may prefer to use SUPL procedure. Thus, instead of MO-LR, UE can use the SUPL procedure as follows, for example:5.2.2.3.3 Request for on demand system information The UE shall:

1> if SIB1 includes si-SchedulingInfo containing si-RequestConfigSUL and criteria to select supplementary uplink as defined in TS 38.321[13], clause 5.1.1 is met:

2> trigger the lower layer to initiate the Random Access procedure on supplementary uplink in accordance with [3] using the PRACH preamble(s) and PRACH resource(s) in si-RequestConfigSUL corresponding to the SI message(s) that the UE requires to operate within the cell, and for which si-BroadcastStatus is set to notBroadcasting;

2>if acknowledgement for SI request is received from lower layers:
   3>acquire the requested SI message(s) as defined in sub-clause 5.2.2.3.2, immediately;
1>else if SIB1 includes si-SchedulingInfo containing si-RequestConfig and criteria to select normal uplink as defined in TS 38.321[13], clause 5.1.1 is met:
  2>if si-BroadcastStatus is set to notBroadcasting trigger the lower layer to initiate the random access procedure on normal uplink in accordance with TS 38.321 [3] using the PRACH preamble(s) and PRACH resource(s) in si-RequestConfig corresponding to the SI message(s) that the UE requires to operate within the cell;
  2>if acknowledgement for SI request is received from lower layers:
   3>acquire the requested SI message(s) as defined in sub-clause 5.2.2.3.2, immediately;
  2>if si-BroadcastStatus is set to unicast and srb-Delivery is set to true
   3>initiate transmission of the RRCSetupRequest message in accordance with 5.3.3.3 with establishment cause si-Request and corresponding to the SI message(s) that the UE requires to operate within the cell;
  2>else if si-BroadcastStatus is set to unicast
   3>initiate the MO-LR procedure in accordance with [TS 23.271];
1>else:
  2>apply the timeAlignmentTimerCommon included in SIB1;
  2>apply the CCCH configuration as specified in 9.1.1.2;
  2>initiate transmission of the RRCSystemInfoRequest message in accordance with 5.2.2.3.4;
  2>if acknowledgement for RRCSystemInfoRequest message is received from lower layers:
   3>acquire the requested SI message(s) as defined in sub-clause 5.2.2.3.2, immediately;
1>if cell reselection occurs while waiting for the acknowledgment for SI request from lower layers:
  2>reset MAC;
  2>if SI request is based on RRCSystemInfoRequest message:
   3>release RLC entity for SRB0.
   NOTE: After RACH failure for SI request it is up to UE implementation when to retry the SI request.

As positioning scheduling info and positioning SIBs are separate from legacy; an alternate text is proposed below mainly for positioning SI. The corresponding text shall be appended in RRC 38.331 specification 5.2.2.X.X Request for on demand Positioning system information The UE shall:
1>if SIBXX includes posSI-SchedulingInfo containing posSI-RequestConfig
  2>if posSI-BroadcastStatus is set to unicast and srb-Delivery is set to true
   3>initiate transmission of the RRCSetupRequest message in accordance with 5.3.3.3 with establishment cause posSI-Request and corresponding to the posSI message(s) that the UE requires to operate within the cell;
  2>else if posSI-BroadcastStatus is set to unicast
   3>initiate the MO-LR procedure in accordance with [TS 23.271];

According to certain embodiments, a NRPPa procedure may be defined whereby Location server can inform the number of UEs and threshold conditions to facilitate gNB in deciding to notify UE whether it should obtain a certain positioning SI message from broadcast or unicast. Further, a counter to keep track of positioning session and to count the request for certain SI message is realized in both location server and gNB respectively. gNB and Location server can share the information in a periodic basis.

In a network embodiment, depending upon the demand of a first SI as compared to second SI, the network may make a decision whether to broadcast first SI and unicast second SI. The demand can be quantified based upon the number of requests or positioning session involved with that SI data content.

In a network embodiment, depending upon the update rate of a first SI as compared to second SI, the network may make a decision as to whether to broadcast first SI and unicast second SI. The update rate is quantified in time duration such as seconds.

Alternatively, in a particular embodiment, the network, in a base station, informs the UE that a certain SI is to be obtained only by using unicast up to a certain duration. The UE knows that until certain duration, the UE should only obtain the SI by means of unicast. The duration can be in terms of UTC time or Hyper System Frame Number, Subframe Number (SFN), etc.

Certain embodiments related to handover may now be described. According to various particular embodiments, at handover, one or more of the below may apply:
   a new cell is informed by the old cell or location server about the UEs capability to support on-demand assistance data delivery via unicast,
   a new cell is informed by the old cell or location server about the UEs interest or current configuration in the old cell related to receiving the on-demand assistance data delivery via unicast,
   if the new cell supports the on-demand assistance data delivery via unicast it can provide it to the UE without a new request from the UE in the new cell but based on the information from the old cell
   after handover, the UE may continue receiving on-demand assistance data via unicast without performing in the new cell all steps of the initiating procedure Certain embodiments related to dual connectivity may now be described. When a UE is in dual or multi-connectivity operation mode (e.g., configured with a Primary Cell (PCell) and Primary Secondary Cell (PSCell)), it may be able to receive the on-demand assistance data via one or more serving cells, according to certain embodiments.

In a particular embodiment, the wireless device (e.g., UE) may choose a single cell from a plurality of serving cells for receiving the on-demand AD via unicast and initiates the procedure for receiving the AD accordingly. The choice may be based, e.g., on what is currently broadcasted or supported by the cells.

In another particular embodiment, the wireless device (e.g., UE) may select more than one cell for receiving the non-overlapping parts of on-demand AD via unicast from these cells and initiates the procedure for receiving the AD accordingly.

In another particular embodiment, providing the overlapping parts of AD via multiple cells is avoided by the network and/or by the UE. For example, the wireless device (e.g., UE) may refrain from initiating the procedure to receive the AD via unicast from one serving cell if the same AD can be obtained via broadcast from another serving cell. In another example, a serving cell may not provide AD via unicast if the same AD is available for the wireless device (e.g., UE) via another serving cell (unicast or broadcast).

Certain embodiments related to requesting/sending on demand data content to UEs in RRC_CONNECTED will now be described.

Current NR specification does not support the requesting of on demand data content (e.g., SIBs) by UE that are in RRC_CONNECTED. In order to support this, in one embodiment for UEs in RRC_CONNECTED, positioning SIBs may be requested via dedicated RRC signaling.

In another embodiment, the used RRC message is a new RRC messages used to request on demand data content e.g., posUEInformationRequest. This message may be eventually used also for other procedures that are positioning-related. Yet, in one embodiment, the used RRC message is an existing RRC message used to request on demand data content to the network e.g., UEAssistanceInformation. In another embodiment, the used RRC message is an existing RRC message(s) generally used for procedures non related to positioning e.g., ULInformationTransfer.

Once the network receives the request from the UE for on demand assistance data content, in one embodiment, this is delivered back to the UE via the existing procedure for delivering SIBs in a dedicated RRC procedure e.g., via RRCReconfiguration message. Yet, in another embodiment, the network send the requested on demand data content to the UE via a new RRC messages specified to enable the directly forwarding of on demand data content to UEs e.g., posUEInformation.

In another embodiment, when the UE in RRC_CONNECTED receive the requested on demand data content, it overrides the existing data content (if present) received previously when in RRC IDLE or RRC INACTIVE. In one embodiment, when the UE in RRC_CONNECTED receive the requested on demand data content, it overrides the existing data content (if present) received previously when in RRC_CONNECTED.

Particular embodiments are further described in FIGS. 3-21 of the drawings, like numerals being used for like and corresponding parts of the various drawings.

Figure 3:
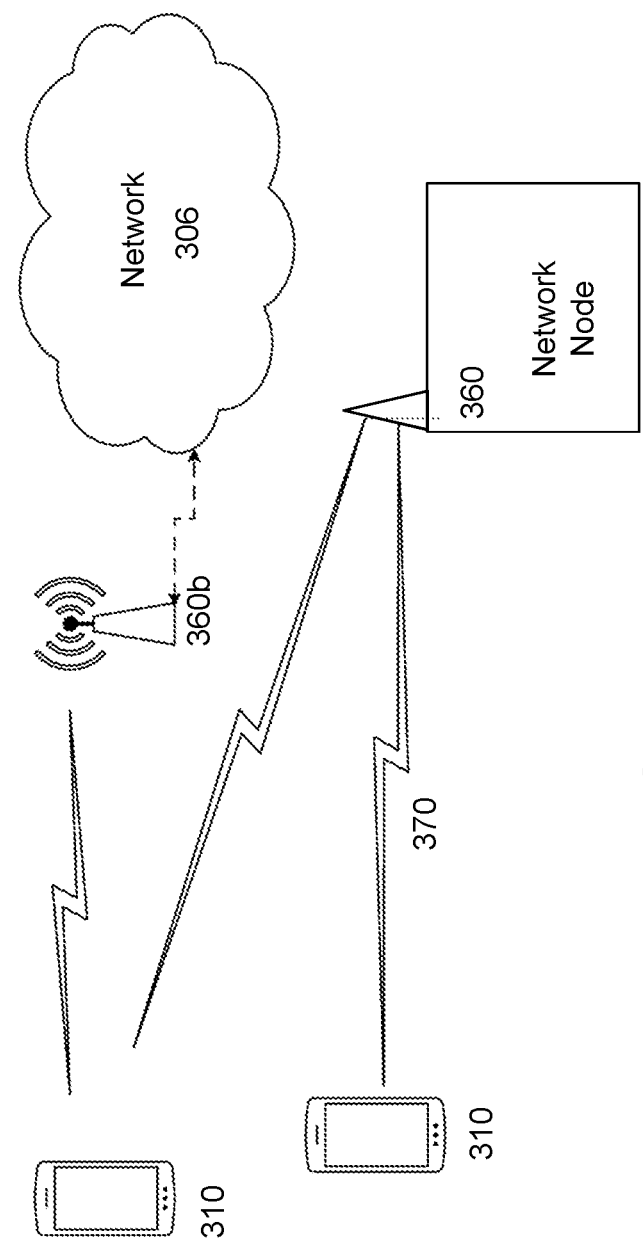
FIG. 3 illustrates an example wireless network, according to certain embodiments.

FIG. 3 illustrates a wireless network, in accordance with some embodiments. Although the subject matter described herein may be implemented in any appropriate type of system using any suitable components, the embodiments disclosed herein are described in relation to a wireless network, such as the example wireless network illustrated in FIG. 3. For simplicity, the wireless network of FIG. 3 only depicts network 306, network nodes 360 and 360b, and wireless devices 310, 310b, and 310c. In practice, a wireless network may further include any additional elements suitable to support communication between wireless devices or between a wireless device and another communication device, such as a landline telephone, a service provider, or any other network node or end device. Of the illustrated components, network node 360 and wireless device 310 are depicted with additional detail. The wireless network may provide communication and other types of services to one or more wireless devices to facilitate the wireless devices' access to and/or use of the services provided by, or via, the wireless network.

The wireless network may comprise and/or interface with any type of communication, telecommunication, data, cellular, and/or radio network or other similar type of system. In some embodiments, the wireless network may be configured to operate according to specific standards or other types of predefined rules or procedures. Thus, particular embodiments of the wireless network may implement communication standards, such as Global System for Mobile Communications (GSM), Universal Mobile Telecommunications System (UMTS), Long Term Evolution (LTE), and/or other suitable 2G, 3G, 4G, or 5G standards; wireless local area network (WLAN) standards, such as the IEEE 802.11 standards; and/or any other appropriate wireless communication standard, such as the Worldwide Interoperability for Microwave Access (WiMax), Bluetooth, Z-Wave and/or ZigBee standards.

Network 306 may comprise one or more backhaul networks, core networks, IP networks, public switched telephone networks (PSTNs), packet data networks, optical networks, wide-area networks (WANs), local area networks (LANs), wireless local area networks (WLANs), wired networks, wireless networks, metropolitan area networks, and other networks to enable communication between devices.

Network node 360 and wireless device 310 comprise various components described in more detail below. These components work together in order to provide network node and/or wireless device functionality, such as providing wireless connections in a wireless network. In different embodiments, the wireless network may comprise any number of wired or wireless networks, network nodes, base stations, controllers, wireless devices, relay stations, and/or any other components or systems that may facilitate or participate in the communication of data and/or signals whether via wired or wireless connections.

Figure 4:
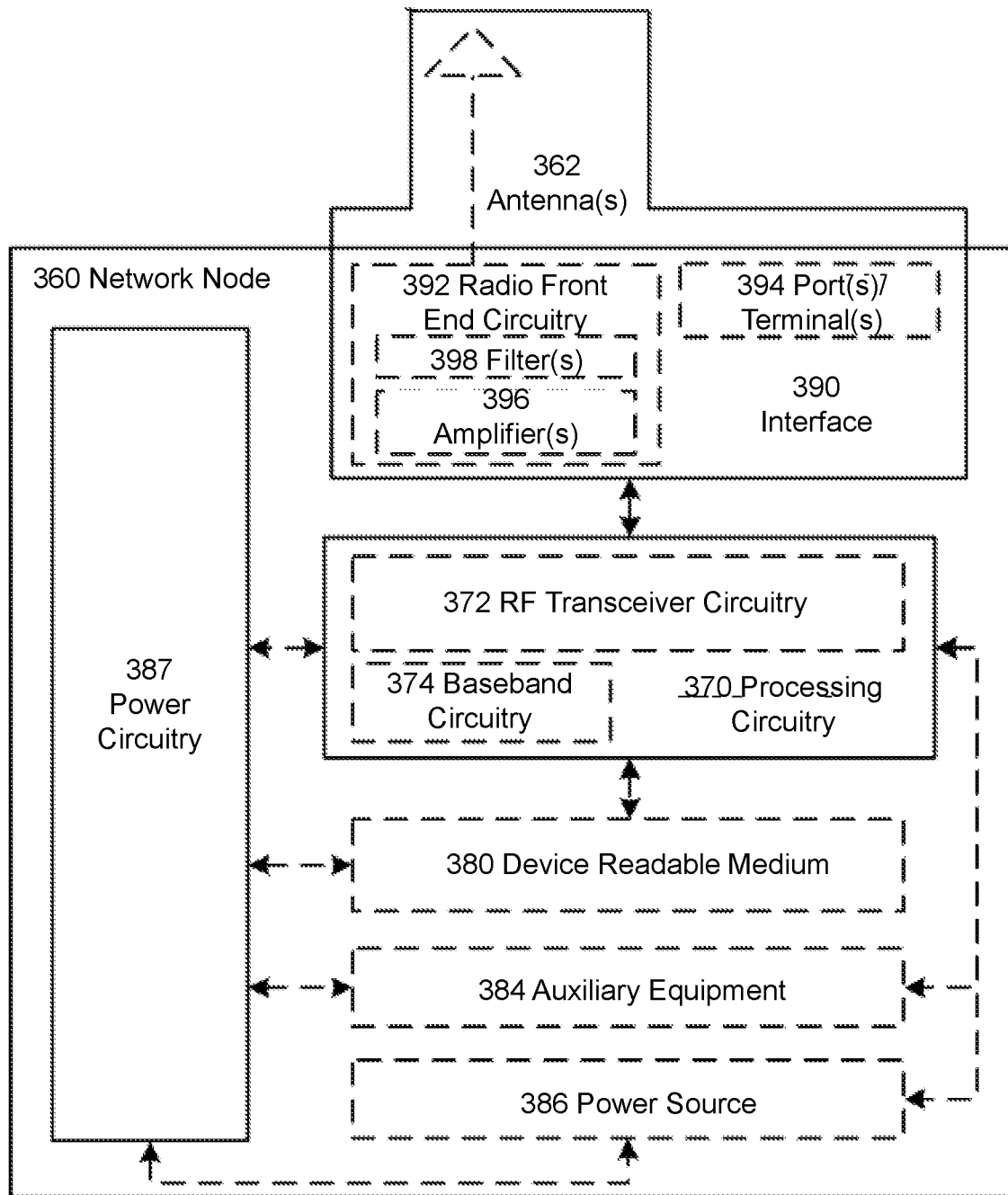
FIG. 4 illustrates an example network node, according to certain embodiments.

FIG. 4 illustrates an example network node 360, according to certain embodiments. As used herein, network node refers to equipment capable, configured, arranged and/or operable to communicate directly or indirectly with a wireless device and/or with other network nodes or equipment in the wireless network to enable and/or provide wireless access to the wireless device and/or to perform other functions (e.g., administration) in the wireless network. Examples of network nodes include, but are not limited to, access points (APs) (e.g., radio access points), base stations (BSs) (e.g., radio base stations, Node Bs, evolved Node Bs (eNBs) and NR NodeBs (gNBs)). Base stations may be categorized based on the amount of coverage they provide (or, stated differently, their transmit power level) and may then also be referred to as femto base stations, pico base stations, micro base stations, or macro base stations. A base station may be a relay node or a relay donor node controlling a relay. A network node may also include one or more (or all) parts of a distributed radio base station such as centralized digital units and/or remote radio units (RRUs), sometimes referred to as Remote Radio Heads (RRHs). Such remote radio units may or may not be integrated with an antenna as an antenna integrated radio. Parts of a distributed radio base station may also be referred to as nodes in a distributed antenna system (DAS). Yet further examples of network nodes include multi-standard radio (MSR) equipment such as MSR BSs, network controllers such as radio network controllers (RNCs) or base station controllers (BSCs), base transceiver stations (BTSs), transmission points, transmission nodes, multi-cell/multicast coordination entities (MCEs), core network nodes (e.g., Mobile Switching Centers (MSCs), Mobility Management Entities (MMEs)), Operations & Maintenance (O&M) nodes, Operations Support System (OSS) nodes, Self-Optimized Network (SON) nodes, positioning nodes (e.g., E-SMLCs), and/or Minimization of Drive Tests (MDTs). As another example, a network node may be a virtual network node as described in more detail below. More generally, however, network nodes may represent any suitable device (or group of devices) capable, configured, arranged, and/or operable to enable and/or provide a wireless device with access to the wireless network or to provide some service to a wireless device that has accessed the wireless network.

In FIG. 4, network node 360 includes processing circuitry 370, device readable medium 380, interface 390, auxiliary equipment 384, power source 386, power circuitry 387, and antenna 362. Although network node 360 illustrated in the example wireless network of FIG. 4 may represent a device that includes the illustrated combination of hardware components, other embodiments may comprise network nodes with different combinations of components. It is to be understood that a network node comprises any suitable combination of hardware and/or software needed to perform the tasks, features, functions and methods disclosed herein. Moreover, while the components of network node 360 are depicted as single boxes located within a larger box, or nested within multiple boxes, in practice, a network node may comprise multiple different physical components that make up a single illustrated component (e.g., device readable medium 380 may comprise multiple separate hard drives as well as multiple RAM modules).

Similarly, network node 360 may be composed of multiple physically separate components (e.g., a NodeB component and a RNC component, or a BTS component and a BSC component, etc.), which may each have their own respective components. In certain scenarios in which network node 360 comprises multiple separate components (e.g., BTS and BSC components), one or more of the separate components may be shared among several network nodes. For example, a single RNC may control multiple NodeB's. In such a scenario, each unique NodeB and RNC pair, may in some instances be considered a single separate network node. In some embodiments, network node 360 may be configured to support multiple radio access technologies (RATs). In such embodiments, some components may be duplicated (e.g., separate device readable medium 380 for the different RATs) and some components may be reused (e.g., the same antenna 362 may be shared by the RATs). Network node 360 may also include multiple sets of the various illustrated components for different wireless technologies integrated into network node 360, such as, for example, Global System for Mobile communication (GSM), Wide Code Division Multiplexing Access (WCDMA), Long Term Evolution (LTE), New Radio (NR), WiFi, or Bluetooth wireless technologies. These wireless technologies may be integrated into the same or different chip or set of chips and other components within network node 360.

Processing circuitry 370 is configured to perform any determining, calculating, or similar operations (e.g., certain obtaining operations) described herein as being provided by a network node. These operations performed by processing circuitry 370 may include processing information obtained by processing circuitry 370 by, for example, converting the obtained information into other information, comparing the obtained information or converted information to information stored in the network node, and/or performing one or more operations based on the obtained information or converted information, and as a result of said processing making a determination.

Processing circuitry 370 may comprise a combination of one or more of a microprocessor, controller, microcontroller, central processing unit, digital signal processor, application-specific integrated circuit, field programmable gate array, or any other suitable computing device, resource, or combination of hardware, software and/or encoded logic operable to provide, either alone or in conjunction with other network node 360 components, such as device readable medium 380, network node 360 functionality. For example, processing circuitry 370 may execute instructions stored in device readable medium 380 or in memory within processing circuitry 370. Such functionality may include providing any of the various wireless features, functions, or benefits discussed herein. In some embodiments, processing circuitry 370 may include a system on a chip (SOC).

In some embodiments, processing circuitry 370 may include one or more of radio frequency (RF) transceiver circuitry 372 and baseband processing circuitry 374. In some embodiments, radio frequency (RF) transceiver circuitry 372 and baseband processing circuitry 374 may be on separate chips (or sets of chips), boards, or units, such as radio units and digital units. In alternative embodiments, part or all of RF transceiver circuitry 372 and baseband processing circuitry 374 may be on the same chip or set of chips, boards, or units.

In certain embodiments, some or all of the functionality described herein as being provided by a network node, base station, eNB or other such network device may be performed by processing circuitry 370 executing instructions stored on device readable medium 380 or memory within processing circuitry 370. In alternative embodiments, some or all of the functionality may be provided by processing circuitry 370 without executing instructions stored on a separate or discrete device readable medium, such as in a hard-wired manner. In any of those embodiments, whether executing instructions stored on a device readable storage medium or not, processing circuitry 370 can be configured to perform the described functionality. The benefits provided by such functionality are not limited to processing circuitry 370 alone or to other components of network node 360 but are enjoyed by network node 360 as a whole, and/or by end users and the wireless network generally.

Device readable medium 380 may comprise any form of volatile or non-volatile computer readable memory including, without limitation, persistent storage, solid-state memory, remotely mounted memory, magnetic media, optical media, random access memory (RAM), read-only memory (ROM), mass storage media (for example, a hard disk), removable storage media (for example, a flash drive, a Compact Disk (CD) or a Digital Video Disk (DVD)), and/or any other volatile or non-volatile, non-transitory device readable and/or computer-executable memory devices that store information, data, and/or instructions that may be used by processing circuitry 370. Device readable medium 380 may store any suitable instructions, data or information, including a computer program, software, an application including one or more of logic, rules, code, tables, etc. and/or other instructions capable of being executed by processing circuitry 370 and, utilized by network node 360. Device readable medium 380 may be used to store any calculations made by processing circuitry 370 and/or any data received via interface 390. In some embodiments, processing circuitry 370 and device readable medium 380 may be considered to be integrated.

Interface 390 is used in the wired or wireless communication of signalling and/or data between network node 360, network 306, and/or wireless devices 310. As illustrated, interface 390 comprises port(s)/terminal(s) 394 to send and receive data, for example to and from network 306 over a wired connection. Interface 390 also includes radio front end circuitry 392 that may be coupled to, or in certain embodiments a part of, antenna 362. Radio front end circuitry 392 comprises filters 398 and amplifiers 396. Radio front end circuitry 392 may be connected to antenna 362 and processing circuitry 370. Radio front end circuitry may be configured to condition signals communicated between antenna 362 and processing circuitry 370. Radio front end circuitry 392 may receive digital data that is to be sent out to other network nodes or wireless devices via a wireless connection. Radio front end circuitry 392 may convert the digital data into a radio signal having the appropriate channel and bandwidth parameters using a combination of filters 398 and/or amplifiers 396. The radio signal may then be transmitted via antenna 362. Similarly, when receiving data, antenna 362 may collect radio signals which are then converted into digital data by radio front end circuitry 392. The digital data may be passed to processing circuitry 370. In other embodiments, the interface may comprise different components and/or different combinations of components.

In certain alternative embodiments, network node 360 may not include separate radio front end circuitry 392, instead, processing circuitry 370 may comprise radio front end circuitry and may be connected to antenna 362 without separate radio front end circuitry 392. Similarly, in some embodiments, all or some of RF transceiver circuitry 372 may be considered a part of interface 390. In still other embodiments, interface 390 may include one or more ports or terminals 394, radio front end circuitry 392, and RF transceiver circuitry 372, as part of a radio unit (not shown), and interface 390 may communicate with baseband processing circuitry 374, which is part of a digital unit (not shown).

Antenna 362 may include one or more antennas, or antenna arrays, configured to send and/or receive wireless signals. Antenna 362 may be coupled to radio front end circuitry 390 and may be any type of antenna capable of transmitting and receiving data and/or signals wirelessly. In some embodiments, antenna 362 may comprise one or more omni-directional, sector or panel antennas operable to transmit/receive radio signals between, for example, 2 GHz and 66 GHz. An omni-directional antenna may be used to transmit/receive radio signals in any direction, a sector antenna may be used to transmit/receive radio signals from devices within a particular area, and a panel antenna may be a line of sight antenna used to transmit/receive radio signals in a relatively straight line. In some instances, the use of more than one antenna may be referred to as MIMO. In certain embodiments, antenna 362 may be separate from network node 360 and may be connectable to network node 360 through an interface or port.

Antenna 362, interface 390, and/or processing circuitry 370 may be configured to perform any receiving operations and/or certain obtaining operations described herein as being performed by a network node. Any information, data and/or signals may be received from a wireless device, another network node and/or any other network equipment. Similarly, antenna 362, interface 390, and/or processing circuitry 370 may be configured to perform any transmitting operations described herein as being performed by a network node. Any information, data and/or signals may be transmitted to a wireless device, another network node and/or any other network equipment.

Power circuitry 387 may comprise, or be coupled to, power management circuitry and is configured to supply the components of network node 360 with power for performing the functionality described herein. Power circuitry 387 may receive power from power source 386. Power source 386 and/or power circuitry 387 may be configured to provide power to the various components of network node 360 in a form suitable for the respective components (e.g., at a voltage and current level needed for each respective component). Power source 386 may either be included in, or external to, power circuitry 387 and/or network node 360. For example, network node 360 may be connectable to an external power source (e.g., an electricity outlet) via an input circuitry or interface such as an electrical cable, whereby the external power source supplies power to power circuitry 387. As a further example, power source 386 may comprise a source of power in the form of a battery or battery pack which is connected to, or integrated in, power circuitry 387. The battery may provide backup power should the external power source fail. Other types of power sources, such as photovoltaic devices, may also be used.

Alternative embodiments of network node 360 may include additional components beyond those shown in FIG. 4 that may be responsible for providing certain aspects of the network node's functionality, including any of the functionality described herein and/or any functionality necessary to support the subject matter described herein. For example, network node 360 may include user interface equipment to allow input of information into network node 360 and to allow output of information from network node 360. This may allow a user to perform diagnostic, maintenance, repair, and other administrative functions for network node 360.

Figure 5:
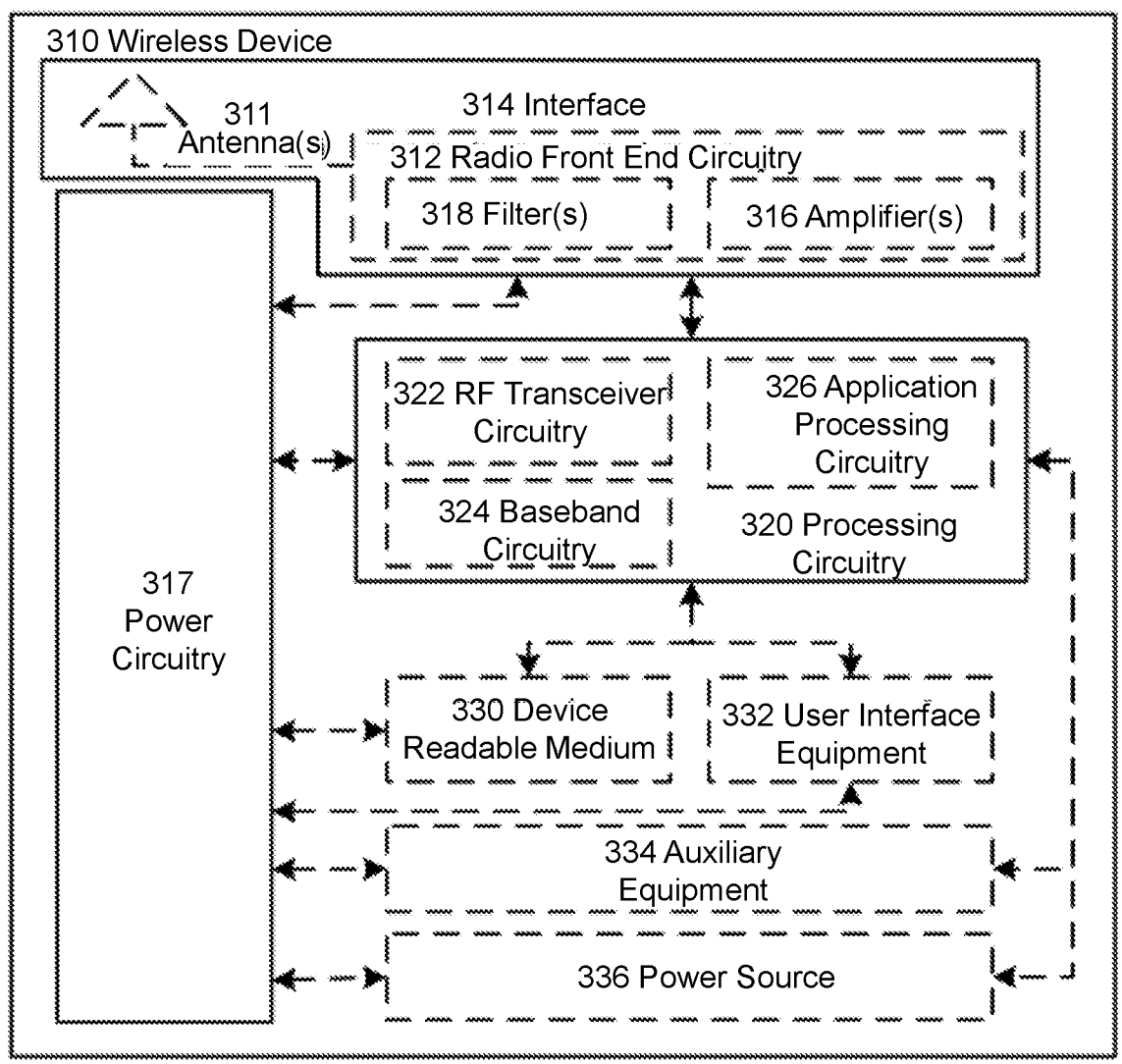
FIG. 5 illustrates an example wireless device, according to certain embodiments.

FIG. 5 illustrates an example wireless device 310, according to certain embodiments. As used herein, wireless device refers to a device capable, configured, arranged and/or operable to communicate wirelessly with network nodes and/or other wireless devices. Unless otherwise noted, the term wireless device may be used interchangeably herein with user equipment (UE). Communicating wirelessly may involve transmitting and/or receiving wireless signals using electromagnetic waves, radio waves, infrared waves, and/or other types of signals suitable for conveying information through air. In some embodiments, a wireless device may be configured to transmit and/or receive information without direct human interaction. For instance, a wireless device may be designed to transmit information to a network on a predetermined schedule, when triggered by an internal or external event, or in response to requests from the network. Examples of a wireless device include, but are not limited to, a smart phone, a mobile phone, a cell phone, a voice over IP (VoIP) phone, a wireless local loop phone, a desktop computer, a personal digital assistant (PDA), a wireless cameras, a gaming console or device, a music storage device, a playback appliance, a wearable terminal device, a wireless endpoint, a mobile station, a tablet, a laptop, a laptop-embedded equipment (LEE), a laptop-mounted equipment (LME), a smart device, a wireless customer-premise equipment (CPE). a vehicle-mounted wireless terminal device, etc. A wireless device may support device-to-device (D2D) communication, for example by implementing a 3GPP standard for sidelink communication, vehicle-to-vehicle (V2V), vehicle-to-infrastructure (V2I), vehicle-to-everything (V2X) and may in this case be referred to as a D2D communication device. As yet another specific example, in an Internet of Things (IoT) scenario, a wireless device may represent a machine or other device that performs monitoring and/or measurements and transmits the results of such monitoring and/or measurements to another wireless device and/or a network node. The wireless device may in this case be a machine-to-machine (M2M) device, which may in a 3GPP context be referred to as an MTC device. As one particular example, the wireless device may be a UE implementing the 3GPP narrow band internet of things (NB-IoT) standard. Particular examples of such machines or devices are sensors, metering devices such as power meters, industrial machinery, or home or personal appliances (e.g. refrigerators, televisions, etc.) personal wearables (e.g., watches, fitness trackers, etc.). In other scenarios, a wireless device may represent a vehicle or other equipment that is capable of monitoring and/or reporting on its operational status or other functions associated with its operation. A wireless device as described above may represent the endpoint of a wireless connection, in which case the device may be referred to as a wireless terminal. Furthermore, a wireless device as described above may be mobile, in which case it may also be referred to as a mobile device or a mobile terminal.

As illustrated, wireless device 310 includes antenna 311, interface 314, processing circuitry 320, device readable medium 330, user interface equipment 332, auxiliary equipment 334, power source 336 and power circuitry 337. Wireless device 310 may include multiple sets of one or more of the illustrated components for different wireless technologies supported by wireless device 310, such as, for example, GSM, WCDMA, LTE, NR, WiFi, WiMAX, or Bluetooth wireless technologies, just to mention a few. These wireless technologies may be integrated into the same or different chips or set of chips as other components within wireless device 310.

Antenna 311 may include one or more antennas or antenna arrays, configured to send and/or receive wireless signals, and is connected to interface 314. In certain alternative embodiments, antenna 311 may be separate from wireless device 310 and be connectable to wireless device 310 through an interface or port. Antenna 311, interface 314, and/or processing circuitry 320 may be configured to perform any receiving or transmitting operations described herein as being performed by a wireless device. Any information, data and/or signals may be received from a network node and/or another wireless device. In some embodiments, radio front end circuitry and/or antenna 311 may be considered an interface.

As illustrated, interface 314 comprises radio front end circuitry 312 and antenna 311. Radio front end circuitry 312 comprise one or more filters 318 and amplifiers 316. Radio front end circuitry 314 is connected to antenna 311 and processing circuitry 320 and is configured to condition signals communicated between antenna 311 and processing circuitry 320. Radio front end circuitry 312 may be coupled to or a part of antenna 311. In some embodiments, wireless device 310 may not include separate radio front end circuitry 312; rather, processing circuitry 320 may comprise radio front end circuitry and may be connected to antenna 311. Similarly, in some embodiments, some or all of RF transceiver circuitry 322 may be considered a part of interface 314. Radio front end circuitry 312 may receive digital data that is to be sent out to other network nodes or wireless devices via a wireless connection. Radio front end circuitry 312 may convert the digital data into a radio signal having the appropriate channel and bandwidth parameters using a combination of filters 318 and/or amplifiers 316. The radio signal may then be transmitted via antenna 311. Similarly, when receiving data, antenna 311 may collect radio signals which are then converted into digital data by radio front end circuitry 312. The digital data may be passed to processing circuitry 320. In other embodiments, the interface may comprise different components and/or different combinations of components.

Processing circuitry 320 may comprise a combination of one or more of a microprocessor, controller, microcontroller, central processing unit, digital signal processor, application-specific integrated circuit, field programmable gate array, or any other suitable computing device, resource, or combination of hardware, software, and/or encoded logic operable to provide, either alone or in conjunction with other wireless device 310 components, such as device readable medium 330, wireless device 310 functionality. Such functionality may include providing any of the various wireless features or benefits discussed herein. For example, processing circuitry 320 may execute instructions stored in device readable medium 330 or in memory within processing circuitry 320 to provide the functionality disclosed herein.

As illustrated, processing circuitry 320 includes one or more of RF transceiver circuitry 322, baseband processing circuitry 324, and application processing circuitry 326. In other embodiments, the processing circuitry may comprise different components and/or different combinations of components. In certain embodiments processing circuitry 320 of wireless device 310 may comprise a SOC. In some embodiments, RF transceiver circuitry 322, baseband processing circuitry 324, and application processing circuitry 326 may be on separate chips or sets of chips. In alternative embodiments, part or all of baseband processing circuitry 324 and application processing circuitry 326 may be combined into one chip or set of chips, and RF transceiver circuitry 322 may be on a separate chip or set of chips. In still alternative embodiments, part or all of RF transceiver circuitry 322 and baseband processing circuitry 324 may be on the same chip or set of chips, and application processing circuitry 326 may be on a separate chip or set of chips. In yet other alternative embodiments, part or all of RF transceiver circuitry 322, baseband processing circuitry 324, and application processing circuitry 326 may be combined in the same chip or set of chips. In some embodiments, RF transceiver circuitry 322 may be a part of interface 314. RF transceiver circuitry 322 may condition RF signals for processing circuitry 320.

In certain embodiments, some or all of the functionality described herein as being performed by a wireless device may be provided by processing circuitry 320 executing instructions stored on device readable medium 330, which in certain embodiments may be a computer-readable storage medium. In alternative embodiments, some or all of the functionality may be provided by processing circuitry 320 without executing instructions stored on a separate or discrete device readable storage medium, such as in a hard-wired manner. In any of those particular embodiments, whether executing instructions stored on a device readable storage medium or not, processing circuitry 320 can be configured to perform the described functionality. The benefits provided by such functionality are not limited to processing circuitry 320 alone or to other components of wireless device 310, but are enjoyed by wireless device 310 as a whole, and/or by end users and the wireless network generally.

Processing circuitry 320 may be configured to perform any determining, calculating, or similar operations (e.g., certain obtaining operations) described herein as being performed by a wireless device. These operations, as performed by processing circuitry 320, may include processing information obtained by processing circuitry 320 by, for example, converting the obtained information into other information, comparing the obtained information or converted information to information stored by wireless device 310, and/or performing one or more operations based on the obtained information or converted information, and as a result of said processing making a determination.

Device readable medium 330 may be operable to store a computer program, software, an application including one or more of logic, rules, code, tables, etc. and/or other instructions capable of being executed by processing circuitry 320. Device readable medium 330 may include computer memory (e.g., Random Access Memory (RAM) or Read Only Memory (ROM)), mass storage media (e.g., a hard disk), removable storage media (e.g., a Compact Disk (CD) or a Digital Video Disk (DVD)), and/or any other volatile or non-volatile, non-transitory device readable and/or computer executable memory devices that store information, data, and/or instructions that may be used by processing circuitry 320. In some embodiments, processing circuitry 320 and device readable medium 330 may be considered to be integrated.

User interface equipment 332 may provide components that allow for a human user to interact with wireless device 310. Such interaction may be of many forms, such as visual, audial, tactile, etc. User interface equipment 332 may be operable to produce output to the user and to allow the user to provide input to wireless device 310. The type of interaction may vary depending on the type of user interface equipment 332 installed in wireless device 310. For example, if wireless device 310 is a smart phone, the interaction may be via a touch screen; if wireless device 310 is a smart meter, the interaction may be through a screen that provides usage (e.g., the number of gallons used) or a speaker that provides an audible alert (e.g., if smoke is detected). User interface equipment 332 may include input interfaces, devices and circuits, and output interfaces, devices and circuits. User interface equipment 332 is configured to allow input of information into wireless device 310 and is connected to processing circuitry 320 to allow processing circuitry 320 to process the input information. User interface equipment 332 may include, for example, a microphone, a proximity or other sensor, keys/buttons, a touch display, one or more cameras, a USB port, or other input circuitry. User interface equipment 332 is also configured to allow output of information from wireless device 310, and to allow processing circuitry 320 to output information from wireless device 310. User interface equipment 332 may include, for example, a speaker, a display, vibrating circuitry, a USB port, a headphone interface, or other output circuitry. Using one or more input and output interfaces, devices, and circuits, of user interface equipment 332, wireless device 310 may communicate with end users and/or the wireless network and allow them to benefit from the functionality described herein.

Auxiliary equipment 334 is operable to provide more specific functionality which may not be generally performed by wireless devices. This may comprise specialized sensors for doing measurements for various purposes, interfaces for additional types of communication such as wired communications etc. The inclusion and type of components of auxiliary equipment 334 may vary depending on the embodiment and/or scenario.

Power source 336 may, in some embodiments, be in the form of a battery or battery pack. Other types of power sources, such as an external power source (e.g., an electricity outlet), photovoltaic devices or power cells, may also be used. Wireless device 310 may further comprise power circuitry 337 for delivering power from power source 336 to the various parts of wireless device 310 which need power from power source 336 to carry out any functionality described or indicated herein. Power circuitry 337 may in certain embodiments comprise power management circuitry. Power circuitry 337 may additionally or alternatively be operable to receive power from an external power source; in which case wireless device 310 may be connectable to the external power source (such as an electricity outlet) via input circuitry or an interface such as an electrical power cable. Power circuitry 337 may also in certain embodiments be operable to deliver power from an external power source to power source 336. This may be, for example, for the charging of power source 336. Power circuitry 337 may perform any formatting, converting, or other modification to the power from power source 336 to make the power suitable for the respective components of wireless device 310 to which power is supplied.

Figure 6:
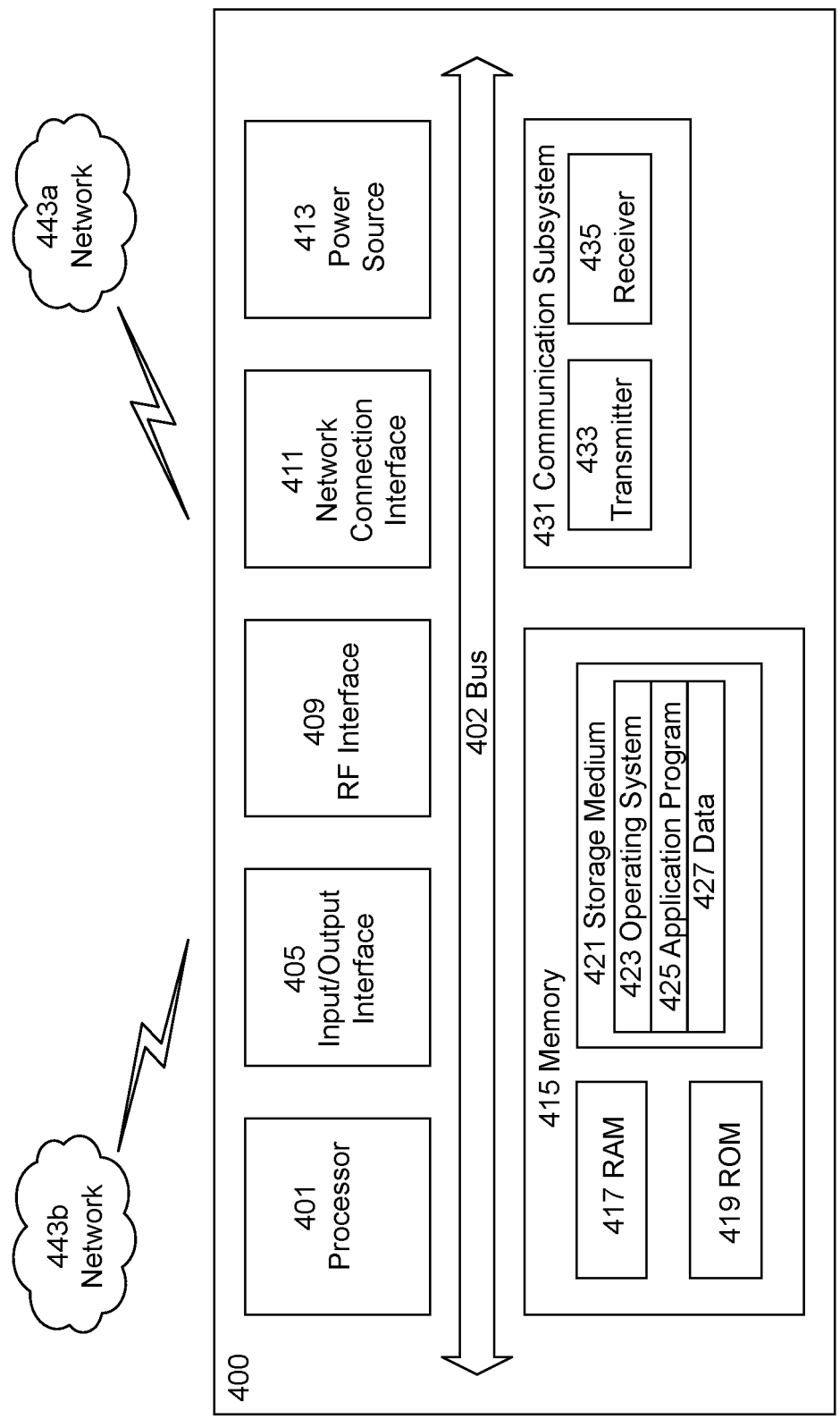
FIG. 6 illustrate an example user equipment, according to certain embodiments.

FIG. 6 illustrates one embodiment of a UE in accordance with various aspects described herein. As used herein, a user equipment or UE may not necessarily have a user in the sense of a human user who owns and/or operates the relevant device. Instead, a UE may represent a device that is intended for sale to, or operation by, a human user but which may not, or which may not initially, be associated with a specific human user (e.g., a smart sprinkler controller). Alternatively, a UE may represent a device that is not intended for sale to, or operation by, an end user but which may be associated with or operated for the benefit of a user (e.g., a smart power meter). UE 400 may be any UE identified by the $3^{rd}$ Generation Partnership Project (3GPP), including a NB-IoT UE, a machine type communication (MTC) UE, and/or an enhanced MTC (eMTC) UE. UE 400, as illustrated in FIG. 6, is one example of a wireless device configured for communication in accordance with one or more communication standards promulgated by the $3^{rd}$ Generation Partnership Project (3GPP), such as 3GPP's GSM, UMTS, LTE, and/or 5G standards. As mentioned previously, the term wireless device and UE may be used interchangeable. Accordingly, although FIG. 6 is a UE, the components discussed herein are equally applicable to a wireless device, and vice-versa.

In FIG. 6, UE 400 includes processing circuitry 401 that is operatively coupled to input/output interface 405, radio frequency (RF) interface 409, network connection interface 411, memory 415 including random access memory (RAM) 417, read-only memory (ROM) 419, and storage medium 421 or the like, communication subsystem 431, power source 433, and/or any other component, or any combination thereof. Storage medium 421 includes operating system 423, application program 425, and data 427. In other embodiments, storage medium 421 may include other similar types of information. Certain UEs may utilize all of the components shown in FIG. 6, or only a subset of the components. The level of integration between the components may vary from one UE to another UE. Further, certain UEs may contain multiple instances of a component, such as multiple processors, memories, transceivers, transmitters, receivers, etc.

In FIG. 6, processing circuitry 401 may be configured to process computer instructions and data. Processing circuitry 401 may be configured to implement any sequential state machine operative to execute machine instructions stored as machine-readable computer programs in the memory, such as one or more hardware-implemented state machines (e.g., in discrete logic, FPGA, ASIC, etc.); programmable logic together with appropriate firmware; one or more stored program, general-purpose processors, such as a microprocessor or Digital Signal Processor (DSP), together with appropriate software; or any combination of the above. For example, the processing circuitry 401 may include two central processing units (CPUs). Data may be information in a form suitable for use by a computer.

In the depicted embodiment, input/output interface 405 may be configured to provide a communication interface to an input device, output device, or input and output device. UE 400 may be configured to use an output device via input/output interface 405. An output device may use the same type of interface port as an input device. For example, a USB port may be used to provide input to and output from UE 400. The output device may be a speaker, a sound card, a video card, a display, a monitor, a printer, an actuator, an emitter, a smartcard, another output device, or any combination thereof. UE 400 may be configured to use an input device via input/output interface 405 to allow a user to capture information into UE 400. The input device may include a touch-sensitive or presence-sensitive display, a camera (e.g., a digital camera, a digital video camera, a web camera, etc.), a microphone, a sensor, a mouse, a trackball, a directional pad, a trackpad, a scroll wheel, a smartcard, and the like. The presence-sensitive display may include a capacitive or resistive touch sensor to sense input from a user. A sensor may be, for instance, an accelerometer, a gyroscope, a tilt sensor, a force sensor, a magnetometer, an optical sensor, a proximity sensor, another like sensor, or any combination thereof. For example, the input device may be an accelerometer, a magnetometer, a digital camera, a microphone, and an optical sensor.

In FIG. 6, RF interface 409 may be configured to provide a communication interface to RF components such as a transmitter, a receiver, and an antenna. Network connection interface 411 may be configured to provide a communication interface to network 443a. Network 443a may encompass wired and/or wireless networks such as a local-area network (LAN), a wide-area network (WAN), a computer network, a wireless network, a telecommunications network, another like network or any combination thereof. For example, network 443a may comprise a Wi-Fi network. Network connection interface 411 may be configured to include a receiver and a transmitter interface used to communicate with one or more other devices over a communication network according to one or more communication protocols, such as Ethernet, TCP/IP, SONET, ATM, or the like. Network connection interface 411 may implement receiver and transmitter functionality appropriate to the communication network links (e.g., optical, electrical, and the like). The transmitter and receiver functions may share circuit components, software or firmware, or alternatively may be implemented separately.

RAM 417 may be configured to interface via bus 402 to processing circuitry 401 to provide storage or caching of data or computer instructions during the execution of software programs such as the operating system, application programs, and device drivers. ROM 419 may be configured to provide computer instructions or data to processing circuitry 401. For example, ROM 419 may be configured to store invariant low-level system code or data for basic system functions such as basic input and output (I/O), startup, or reception of keystrokes from a keyboard that are stored in a non-volatile memory. Storage medium 421 may be configured to include memory such as RAM, ROM, programmable read-only memory (PROM), erasable programmable read-only memory (EPROM), electrically erasable programmable read-only memory (EEPROM), magnetic disks, optical disks, floppy disks, hard disks, removable cartridges, or flash drives. In one example, storage medium 421 may be configured to include operating system 423, application program 425 such as a web browser application, a widget or gadget engine or another application, and data file 427. Storage medium 421 may store, for use by UE 400, any of a variety of various operating systems or combinations of operating systems.

Storage medium 421 may be configured to include a number of physical drive units, such as redundant array of independent disks (RAID), floppy disk drive, flash memory, USB flash drive, external hard disk drive, thumb drive, pen drive, key drive, high-density digital versatile disc (HD-DVD) optical disc drive, internal hard disk drive, Blu-Ray optical disc drive, holographic digital data storage (HDDS) optical disc drive, external mini-dual in-line memory module (DIMM), synchronous dynamic random access memory (SDRAM), external micro-DIMM SDRAM, smartcard memory such as a subscriber identity module or a removable user identity (SIM/RUIM) module, other memory, or any combination thereof. Storage medium 421 may allow UE 400 to access computer-executable instructions, application programs or the like, stored on transitory or non-transitory memory media, to off-load data, or to upload data. An article of manufacture, such as one utilizing a communication system may be tangibly embodied in storage medium 421, which may comprise a device readable medium.

In FIG. 6, processing circuitry 401 may be configured to communicate with network 443b using communication subsystem 431. Network 443a and network 443b may be the same network or networks or different network or networks. Communication subsystem 431 may be configured to include one or more transceivers used to communicate with network 443b. For example, communication subsystem 431 may be configured to include one or more transceivers used to communicate with one or more remote transceivers of another device capable of wireless communication such as another wireless device, UE, or base station of a radio access network (RAN) according to one or more communication protocols, such as IEEE 802.4, Code Division Multiplexing Access (CDMA), Wide CDMA (WCDMA), Global System for Mobile communication (GSM), Long Term Evolution (LTE), Universal Terrestrial Radio Access Network (UTRAN), WiMax, or the like. Each transceiver may include transmitter 433 and/or receiver 435 to implement transmitter or receiver functionality, respectively, appropriate to the RAN links (e.g., frequency allocations and the like). Further, transmitter 433 and receiver 435 of each transceiver may share circuit components, software or firmware, or alternatively may be implemented separately.

In the illustrated embodiment, the communication functions of communication subsystem 431 may include data communication, voice communication, multimedia communication, short-range communications such as Bluetooth, near-field communication, location-based communication such as the use of the global positioning system (GPS) to determine a location, another like communication function, or any combination thereof. For example, communication subsystem 431 may include cellular communication, Wi-Fi communication, Bluetooth communication, and GPS communication. Network 443b may encompass wired and/or wireless networks such as a local-area network (LAN), a wide-area network (WAN), a computer network, a wireless network, a telecommunications network, another like network or any combination thereof. For example, network 443b may be a cellular network, a Wi-Fi network, and/or a near-field network. Power source 413 may be configured to provide alternating current (AC) or direct current (DC) power to components of UE 400.

The features, benefits and/or functions described herein may be implemented in one of the components of UE 400 or partitioned across multiple components of UE 400. Further, the features, benefits, and/or functions described herein may be implemented in any combination of hardware, software or firmware. In one example, communication subsystem 431 may be configured to include any of the components described herein. Further, processing circuitry 401 may be configured to communicate with any of such components over bus 402. In another example, any of such components may be represented by program instructions stored in memory that when executed by processing circuitry 401 perform the corresponding functions described herein. In another example, the functionality of any of such components may be partitioned between processing circuitry 401 and communication subsystem 431. In another example, the non-computationally intensive functions of any of such components may be implemented in software or firmware and the computationally intensive functions may be implemented in hardware.

Figure 7:
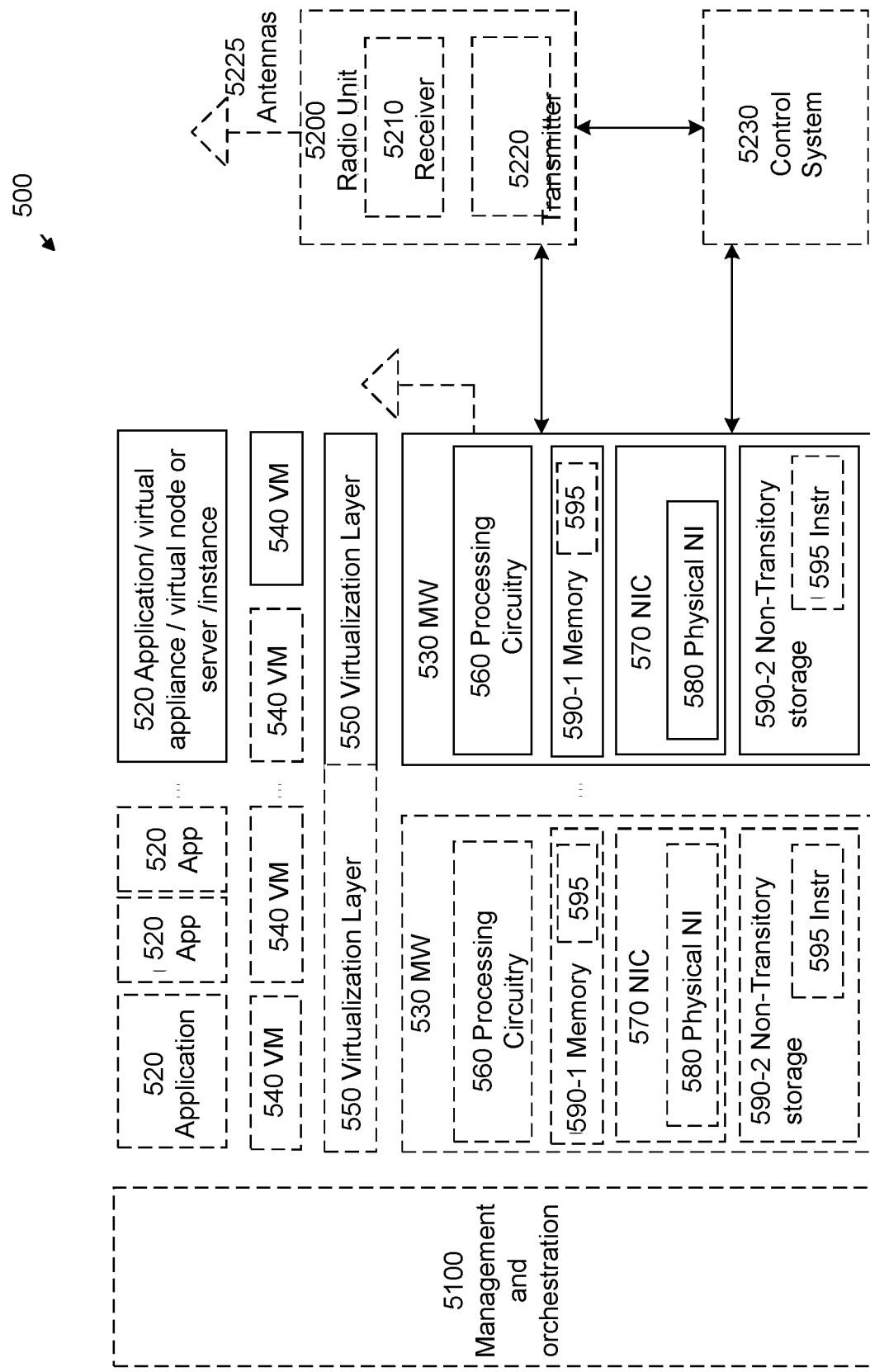
FIG. 7 illustrates a virtualization environment in which functions implemented by some embodiments may be virtualized, according to certain embodiments.

FIG. 7 is a schematic block diagram illustrating a virtualization environment 500 in which functions implemented by some embodiments may be virtualized. In the present context, virtualizing means creating virtual versions of apparatuses or devices which may include virtualizing hardware platforms, storage devices and networking resources. As used herein, virtualization can be applied to a node (e.g., a virtualized base station or a virtualized radio access node) or to a device (e.g., a UE, a wireless device or any other type of communication device) or components thereof and relates to an implementation in which at least a portion of the functionality is implemented as one or more virtual components (e.g., via one or more applications, components, functions, virtual machines or containers executing on one or more physical processing nodes in one or more networks).

In some embodiments, some or all of the functions described herein may be implemented as virtual components executed by one or more virtual machines implemented in one or more virtual environments 500 hosted by one or more of hardware nodes 530. Further, in embodiments in which the virtual node is not a radio access node or does not require radio connectivity (e.g., a core network node), then the network node may be entirely virtualized.

The functions may be implemented by one or more applications 520 (which may alternatively be called software instances, virtual appliances, network functions, virtual nodes, virtual network functions, etc.) operative to implement some of the features, functions, and/or benefits of some of the embodiments disclosed herein. Applications 520 are run in virtualization environment 500 which provides hardware 530 comprising processing circuitry 560 and memory 590. Memory 590 contains instructions 595 executable by processing circuitry 560 whereby application 520 is operative to provide one or more of the features, benefits, and/or functions disclosed herein.

Virtualization environment 500, comprises general-purpose or special-purpose network hardware devices 530 comprising a set of one or more processors or processing circuitry 560, which may be commercial off-the-shelf (COTS) processors, dedicated Application Specific Integrated Circuits (ASICs), or any other type of processing circuitry including digital or analog hardware components or special purpose processors. Each hardware device may comprise memory 590-1 which may be non-persistent memory for temporarily storing instructions 595 or software executed by processing circuitry 560. Each hardware device may comprise one or more network interface controllers (NICs) 570, also known as network interface cards, which include physical network interface 580. Each hardware device may also include non-transitory, persistent, machine-readable storage media 590-2 having stored therein software 595 and/or instructions executable by processing circuitry 560. Software 595 may include any type of software including software for instantiating one or more virtualization layers 550 (also referred to as hypervisors), software to execute virtual machines 540 as well as software allowing it to execute functions, features and/or benefits described in relation with some embodiments described herein.

Virtual machines 540, comprise virtual processing, virtual memory, virtual networking or interface and virtual storage, and may be run by a corresponding virtualization layer 550 or hypervisor. Different embodiments of the instance of virtual appliance 520 may be implemented on one or more of virtual machines 540, and the implementations may be made in different ways.

During operation, processing circuitry 560 executes software 595 to instantiate the hypervisor or virtualization layer 550, which may sometimes be referred to as a virtual machine monitor (VMM). Virtualization layer 550 may present a virtual operating platform that appears like networking hardware to virtual machine 540.

As shown in FIG. 7, hardware 530 may be a standalone network node with generic or specific components. Hardware 530 may comprise antenna 5225 and may implement some functions via virtualization. Alternatively, hardware 530 may be part of a larger cluster of hardware (e.g. such as in a data center or customer premise equipment (CPE)) where many hardware nodes work together and are managed via management and orchestration (MANO) 5100, which, among others, oversees lifecycle management of applications 520.

Virtualization of the hardware is in some contexts referred to as network function virtualization (NFV). NFV may be used to consolidate many network equipment types onto industry standard high volume server hardware, physical switches, and physical storage, which can be located in data centers, and customer premise equipment.

In the context of NFV, virtual machine 540 may be a software implementation of a physical machine that runs programs as if they were executing on a physical, non-virtualized machine. Each of virtual machines 540, and that part of hardware 530 that executes that virtual machine, be it hardware dedicated to that virtual machine and/or hardware shared by that virtual machine with others of the virtual machines 540, forms a separate virtual network elements (VNE).

Still in the context of NFV, Virtual Network Function (VNF) is responsible for handling specific network functions that run in one or more virtual machines 540 on top of hardware networking infrastructure 530 and corresponds to application 520 in FIG. 7.

In some embodiments, one or more radio units 5200 that each include one or more transmitters 5220 and one or more receivers 5210 may be coupled to one or more antennas 5225. Radio units 5200 may communicate directly with hardware nodes 530 via one or more appropriate network interfaces and may be used in combination with the virtual components to provide a virtual node with radio capabilities, such as a radio access node or a base station.

In some embodiments, some signaling can be affected with the use of control system 5230 which may alternatively be used for communication between the hardware nodes 530 and radio units 5200.

Figure 8:
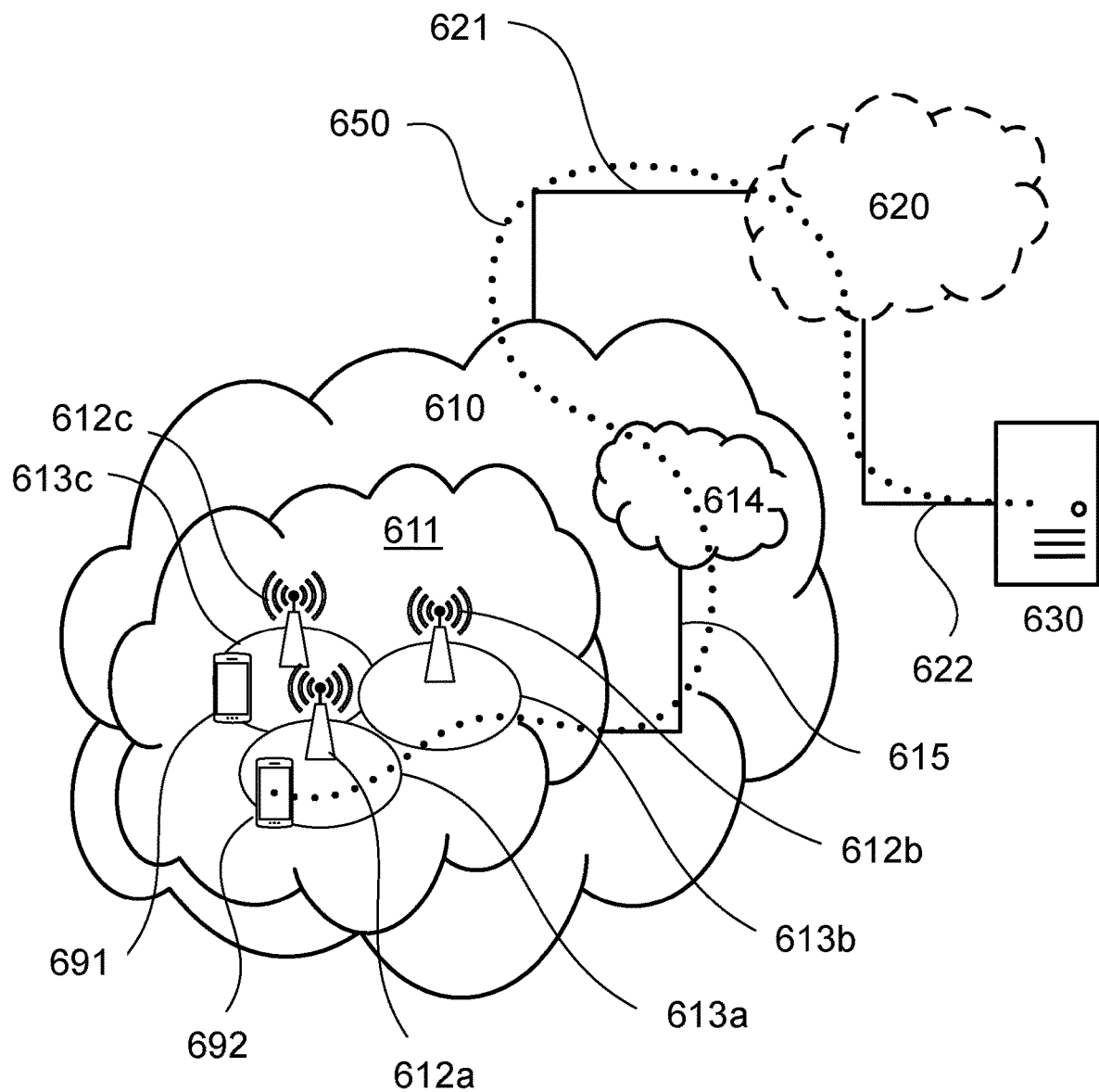
FIG. 8 illustrates a telecommunication network connected via an intermediate network to a host computer, according to certain embodiments.

FIG. 8 illustrates a telecommunication network connected via an intermediate network to a host computer in accordance with some embodiments.

With reference to FIG. 8, in accordance with an embodiment, a communication system includes telecommunication network 610, such as a 3GPP-type cellular network, which comprises access network 611, such as a radio access network, and core network 614. Access network 611 comprises a plurality of base stations 612a, 612b, 612c, such as NBs, eNBs, gNBs or other types of wireless access points, each defining a corresponding coverage area 613a, 613b, 613c. Each base station 612a, 612b, 612c is connectable to core network 614 over a wired or wireless connection 615. A first UE 691 located in coverage area 613c is configured to wirelessly connect to, or be paged by, the corresponding base station 612c. A second UE 692 in coverage area 613a is wirelessly connectable to the corresponding base station 612a. While a plurality of UEs 691, 692 are illustrated in this example, the disclosed embodiments are equally applicable to a situation where a sole UE is in the coverage area or where a sole UE is connecting to the corresponding base station 612.

Telecommunication network 610 is itself connected to host computer 630, which may be embodied in the hardware and/or software of a standalone server, a cloud-implemented server, a distributed server or as processing resources in a server farm. Host computer 630 may be under the ownership or control of a service provider or may be operated by the service provider or on behalf of the service provider. Connections 621 and 622 between telecommunication network 610 and host computer 630 may extend directly from core network 614 to host computer 630 or may go via an optional intermediate network 620. Intermediate network 620 may be one of, or a combination of more than one of, a public, private or hosted network; intermediate network 620, if any, may be a backbone network or the Internet; in particular, intermediate network 620 may comprise two or more sub-networks (not shown).

The communication system of FIG. 8 as a whole enables connectivity between the connected UEs 691, 692 and host computer 630. The connectivity may be described as an over-the-top (OTT) connection 650. Host computer 630 and the connected UEs 691, 692 are configured to communicate data and/or signaling via OTT connection 650, using access network 611, core network 614, any intermediate network 620 and possible further infrastructure (not shown) as intermediaries. OTT connection 650 may be transparent in the sense that the participating communication devices through which OTT connection 650 passes are unaware of routing of uplink and downlink communications. For example, base station 612 may not or need not be informed about the past routing of an incoming downlink communication with data originating from host computer 630 to be forwarded (e.g., handed over) to a connected UE 691. Similarly, base station 612 need not be aware of the future routing of an outgoing uplink communication originating from the UE 691 towards the host computer 630.

Figure 9:
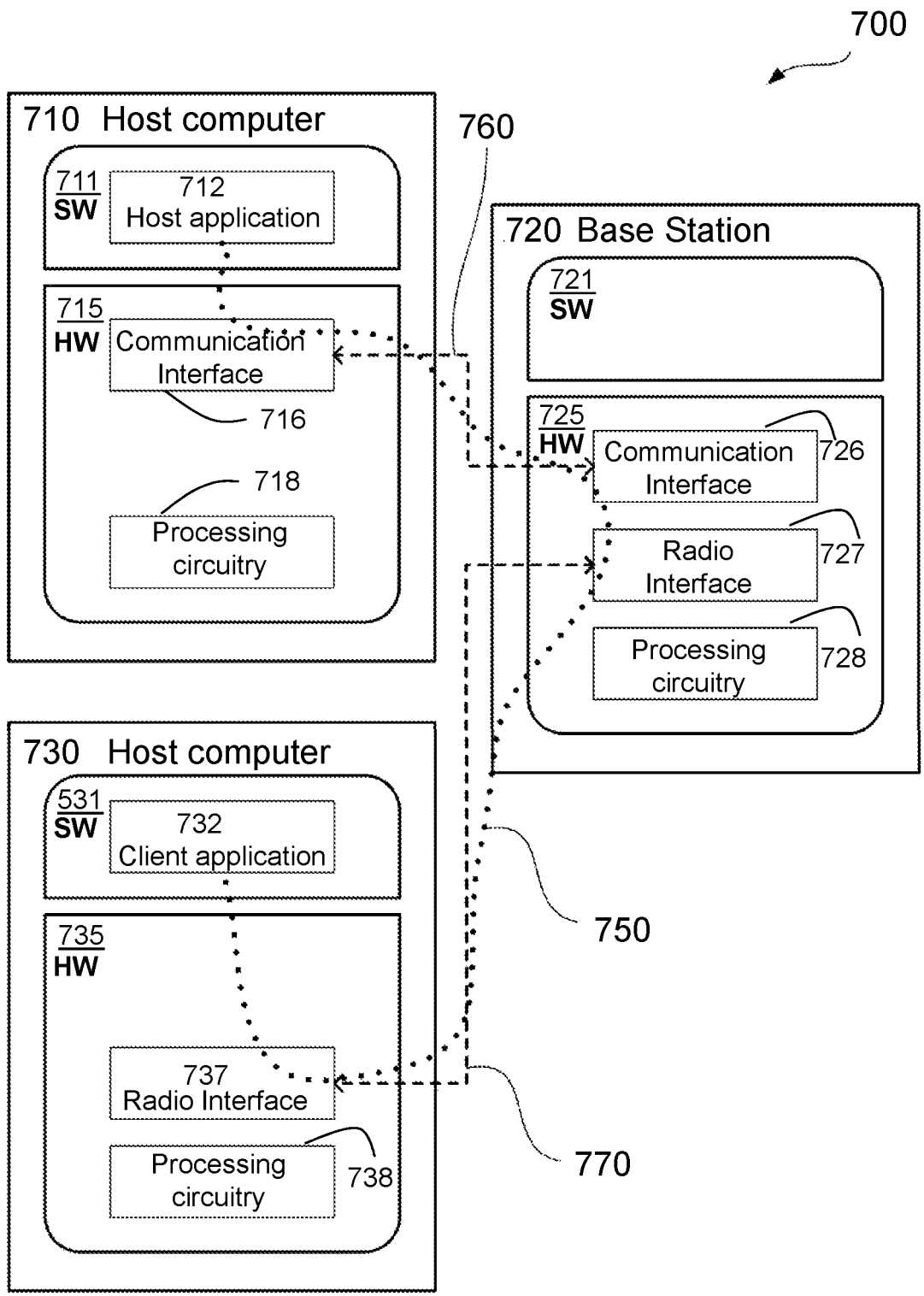
FIG. 9 illustrates a generalized block diagram of a host computer communicating via a base station with a user equipment over a partially wireless connection, according to certain embodiments.

FIG. 9 illustrates a host computer communicating via a base station with a user equipment over a partially wireless connection in accordance with some embodiments.

Example implementations, in accordance with an embodiment, of the UE, base station and host computer discussed in the preceding paragraphs will now be described with reference to FIG. 9. In communication system 700, host computer 710 comprises hardware 715 including communication interface 716 configured to set up and maintain a wired or wireless connection with an interface of a different communication device of communication system 700. Host computer 710 further comprises processing circuitry 718, which may have storage and/or processing capabilities. In particular, processing circuitry 718 may comprise one or more programmable processors, application-specific integrated circuits, field programmable gate arrays or combinations of these (not shown) adapted to execute instructions. Host computer 710 further comprises software 711, which is stored in or accessible by host computer 710 and executable by processing circuitry 718. Software 711 includes host application 712. Host application 712 may be operable to provide a service to a remote user, such as UE 730 connecting via OTT connection 750 terminating at UE 730 and host computer 710. In providing the service to the remote user, host application 712 may provide user data which is transmitted using OTT connection 750.

Communication system 700 further includes base station 720 provided in a telecommunication system and comprising hardware 725 enabling it to communicate with host computer 710 and with UE 730. Hardware 725 may include communication interface 726 for setting up and maintaining a wired or wireless connection with an interface of a different communication device of communication system 700, as well as radio interface 727 for setting up and maintaining at least wireless connection 770 with UE 730 located in a coverage area (not shown in FIG. 9) served by base station 720. Communication interface 726 may be configured to facilitate connection 760 to host computer 710. Connection 760 may be direct or it may pass through a core network (not shown in FIG. 9) of the telecommunication system and/or through one or more intermediate networks outside the telecommunication system. In the embodiment shown, hardware 725 of base station 720 further includes processing circuitry 728, which may comprise one or more programmable processors, application-specific integrated circuits, field programmable gate arrays or combinations of these (not shown) adapted to execute instructions. Base station 720 further has software 721 stored internally or accessible via an external connection.

Communication system 700 further includes UE 730 already referred to. Its hardware 735 may include radio interface 737 configured to set up and maintain wireless connection 770 with a base station serving a coverage area in which UE 730 is currently located. Hardware 735 of UE 730 further includes processing circuitry 738, which may comprise one or more programmable processors, application-specific integrated circuits, field programmable gate arrays or combinations of these (not shown) adapted to execute instructions. UE 730 further comprises software 731, which is stored in or accessible by UE 730 and executable by processing circuitry 738. Software 731 includes client application 732. Client application 732 may be operable to provide a service to a human or non-human user via UE 730, with the support of host computer 710. In host computer 710, an executing host application 712 may communicate with the executing client application 732 via OTT connection 750 terminating at UE 730 and host computer 710. In providing the service to the user, client application 732 may receive request data from host application 712 and provide user data in response to the request data. OTT connection 750 may transfer both the request data and the user data. Client application 732 may interact with the user to generate the user data that it provides.

It is noted that host computer 710, base station 720 and UE 730 illustrated in FIG. 9 may be similar or identical to host computer 630, one of base stations 612a, 612b, 612c and one of UEs 691, 692 of FIG. 8, respectively. This is to say, the inner workings of these entities may be as shown in FIG. 9 and independently, the surrounding network topology may be that of FIG. 8.

In FIG. 9, OTT connection 750 has been drawn abstractly to illustrate the communication between host computer 710 and UE 730 via base station 720, without explicit reference to any intermediary devices and the precise routing of messages via these devices. Network infrastructure may determine the routing, which it may be configured to hide from UE 730 or from the service provider operating host computer 710, or both. While OTT connection 750 is active, the network infrastructure may further take decisions by which it dynamically changes the routing (e.g., on the basis of load balancing consideration or reconfiguration of the network).

Wireless connection 770 between UE 730 and base station 720 is in accordance with the teachings of the embodiments described throughout this disclosure. One or more of the various embodiments improve the performance of OTT services provided to UE 730 using OTT connection 750, in which wireless connection 770 forms the last segment. More precisely, the teachings of these embodiments may improve the data rate, latency, and/or power consumption and thereby provide benefits such as reduced user waiting time, relaxed restriction on file size, better responsiveness, and/or extended battery lifetime.

A measurement procedure may be provided for the purpose of monitoring data rate, latency and other factors on which the one or more embodiments improve. There may further be an optional network functionality for reconfiguring OTT connection 750 between host computer 710 and UE 730, in response to variations in the measurement results. The measurement procedure and/or the network functionality for reconfiguring OTT connection 750 may be implemented in software 711 and hardware 715 of host computer 710 or in software 731 and hardware 735 of UE 730, or both. In embodiments, sensors (not shown) may be deployed in or in association with communication devices through which OTT connection 750 passes; the sensors may participate in the measurement procedure by supplying values of the monitored quantities exemplified above or supplying values of other physical quantities from which software 711, 731 may compute or estimate the monitored quantities. The reconfiguring of OTT connection 750 may include message format, retransmission settings, preferred routing etc.; the reconfiguring need not affect base station 720, and it may be unknown or imperceptible to base station 720. Such procedures and functionalities may be known and practiced in the art. In certain embodiments, measurements may involve proprietary UE signaling facilitating host computer 710's measurements of throughput, propagation times, latency and the like. The measurements may be implemented in that software 711 and 731 causes messages to be transmitted, in particular empty or 'dummy' messages, using OTT connection 750 while it monitors propagation times, errors etc.

Figures 10, 11:
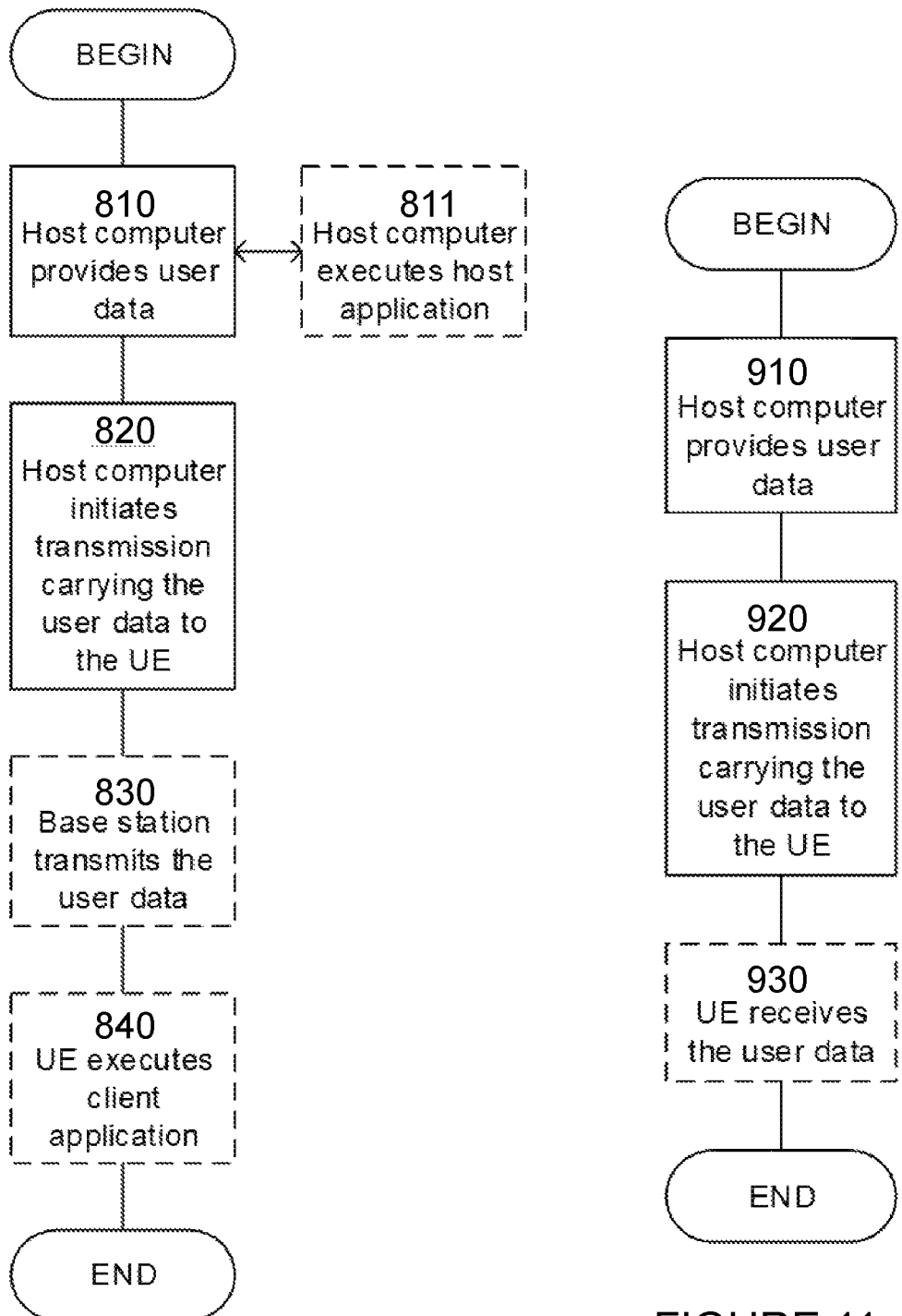
FIG. 10 illustrates a method implemented in a communication system, according to one embodiment.
FIG. 11 illustrates another method implemented in a communication system, according to one embodiment.

FIG. 10 is a flowchart illustrating a method implemented in a communication system, in accordance with one embodiment. The communication system includes a host computer, a base station and a UE which may be those described with reference to FIGS. 8 and 9. For simplicity of the present disclosure, only drawing references to FIG. 10 will be included in this section. In step 810, the host computer provides user data. In substep 811 (which may be optional) of step 810, the host computer provides the user data by executing a host application. In step 820, the host computer initiates a transmission carrying the user data to the UE. In step 830 (which may be optional), the base station transmits to the UE the user data which was carried in the transmission that the host computer initiated, in accordance with the teachings of the embodiments described throughout this disclosure. In step 840 (which may also be optional), the UE executes a client application associated with the host application executed by the host computer.

FIG. 11 is a flowchart illustrating a method implemented in a communication system, in accordance with one embodiment. The communication system includes a host computer, a base station and a UE which may be those described with reference to FIGS. 8 and 9. For simplicity of the present disclosure, only drawing references to FIG. 11 will be included in this section. In step 910 of the method, the host computer provides user data. In an optional substep (not shown) the host computer provides the user data by executing a host application. In step 920, the host computer initiates a transmission carrying the user data to the UE. The transmission may pass via the base station, in accordance with the teachings of the embodiments described throughout this disclosure. In step 930 (which may be optional), the UE receives the user data carried in the transmission.

FIG. 12 is a flowchart illustrating a method implemented in a communication system, in accordance with one embodiment. The communication system includes a host computer, a base station and a UE which may be those described with reference to FIGS. 8 and 9. For simplicity of the present disclosure, only drawing references to FIG. 12 will be included in this section. In step 1010 (which may be optional), the UE receives input data provided by the host computer. Additionally or alternatively, in step 1020, the UE provides user data. In substep 1021 (which may be optional) of step 1020, the UE provides the user data by executing a client application. In substep 1011 (which may be optional) of step 1010, the UE executes a client application which provides the user data in reaction to the received input data provided by the host computer. In providing the user data, the executed client application may further consider user input received from the user. Regardless of the specific manner in which the user data was provided, the UE initiates, in substep 1030 (which may be optional), transmission of the user data to the host computer. In step 1040 of the method, the host computer receives the user data transmitted from the UE, in accordance with the teachings of the embodiments described throughout this disclosure.

FIG. 13 is a flowchart illustrating a method implemented in a communication system, in accordance with one embodiment. The communication system includes a host computer, a base station and a UE which may be those described with reference to FIGS. 8 and 9. For simplicity of the present disclosure, only drawing references to FIG. 13 will be included in this section. In step 1110 (which may be optional), in accordance with the teachings of the embodiments described throughout this disclosure, the base station receives user data from the UE. In step 1120 (which may be optional), the base station initiates transmission of the received user data to the host computer. In step 1130 (which may be optional), the host computer receives the user data carried in the transmission initiated by the base station.

Figure 14:
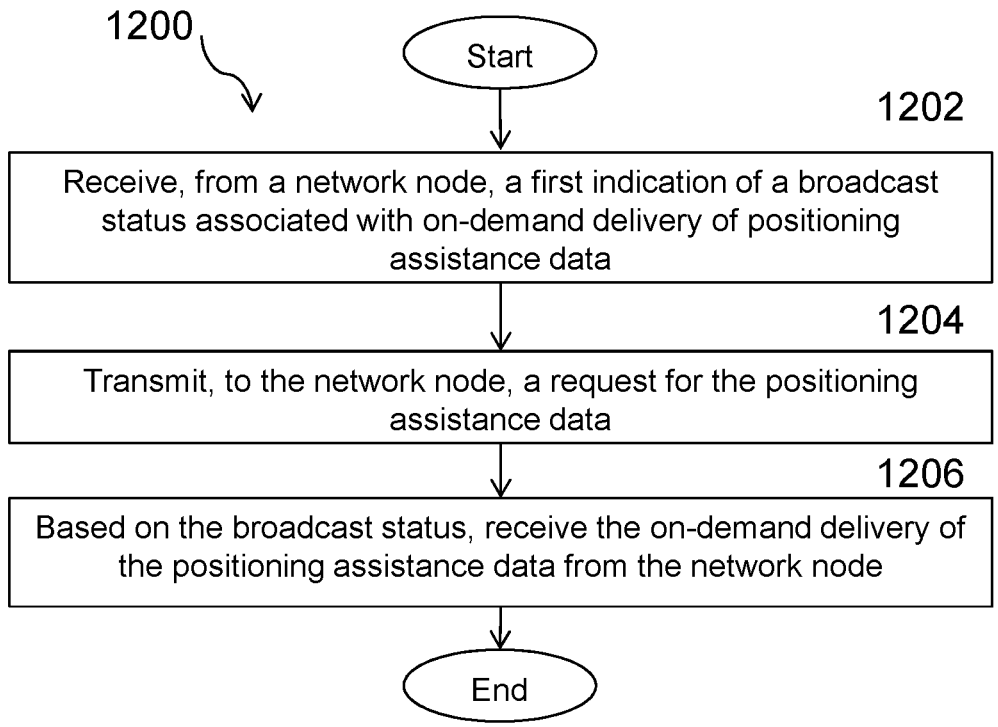
FIG. 14 illustrates an example method by a wireless device, according to certain embodiments.

FIG. 14 depicts a method 1200 by a wireless device 310, according to certain embodiments. At step 1202, the wireless device 310 receives, from a network node 360, a first indication of a broadcast status associated with on-demand delivery of positioning assistance data. At step 1204, the wireless device 310 transmits, to the network node 360, a request for the positioning assistance data. At step 1206, and based on the broadcast status, the wireless device 310 receives the on-demand delivery of the positioning assistance data from the network node 360.

Figure 15:
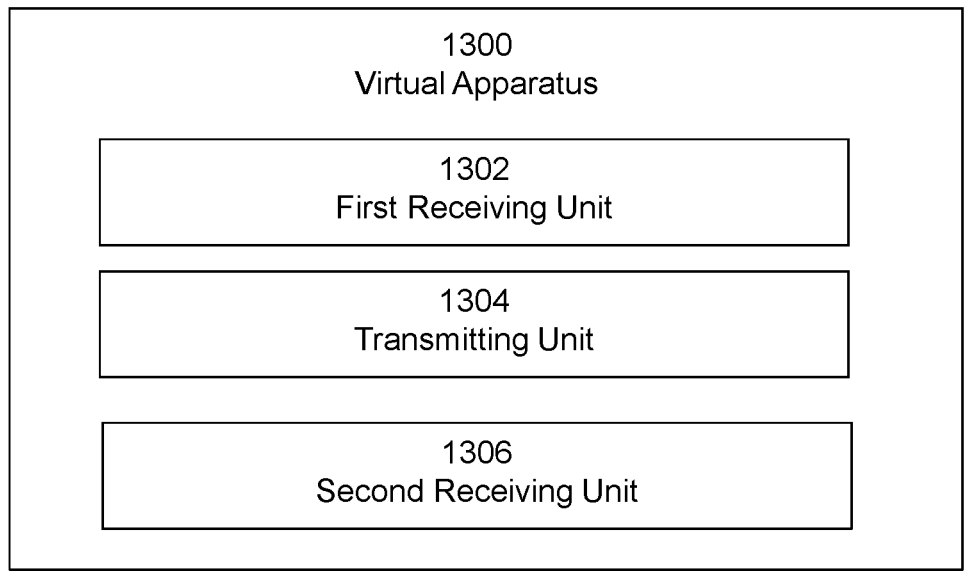
FIG. 15 illustrates an exemplary virtual computing device, according to certain embodiments.

FIG. 15 illustrates a schematic block diagram of a virtual apparatus 1300 in a wireless network (for example, the wireless network shown in FIG. 3). The apparatus may be implemented in a wireless device or network node (e.g., wireless device 310 or network node 360 shown in FIG. 3). Apparatus 1300 is operable to carry out the example method described with reference to FIG. 14 and possibly any other processes or methods disclosed herein. It is also to be understood that the method of FIG. 14 is not necessarily carried out solely by apparatus 1300. At least some operations of the method can be performed by one or more other entities.

Virtual Apparatus 1300 may comprise processing circuitry, which may include one or more microprocessor or microcontrollers, as well as other digital hardware, which may include digital signal processors (DSPs), special-purpose digital logic, and the like. The processing circuitry may be configured to execute program code stored in memory, which may include one or several types of memory such as read-only memory (ROM), random-access memory, cache memory, flash memory devices, optical storage devices, etc. Program code stored in memory includes program instructions for executing one or more telecommunications and/or data communications protocols as well as instructions for carrying out one or more of the techniques described herein, in several embodiments. In some implementations, the processing circuitry may be used to cause first receiving module 1310, transmitting module 1320, second receiving module 1330, and any other suitable units of apparatus 1300 to perform corresponding functions according one or more embodiments of the present disclosure.

According to certain embodiments, first receiving module 1310 may perform certain of the receiving functions of the apparatus 1300. For example, first receiving module 1310 may receive, from a network node, a first indication of a broadcast status associated with on-demand delivery of positioning assistance data.

According to certain embodiments, transmitting module 1320 may perform certain of the transmitting functions of the apparatus 1300. For example, transmitting module 1320 may transmit, to the network node, a request for the positioning assistance data.

According to certain embodiments, second receiving module 1330 may perform certain of the receiving functions of the apparatus 1300. For example, based on the broadcast status, second receiving module 1330 may receive the on-demand delivery of the positioning assistance data from the network node.

The term unit may have conventional meaning in the field of electronics, electrical devices and/or electronic devices and may include, for example, electrical and/or electronic circuitry, devices, modules, processors, memories, logic solid state and/or discrete devices, computer programs or instructions for carrying out respective tasks, procedures, computations, outputs, and/or displaying functions, and so on, as such as those that are described herein.

Figure 16:
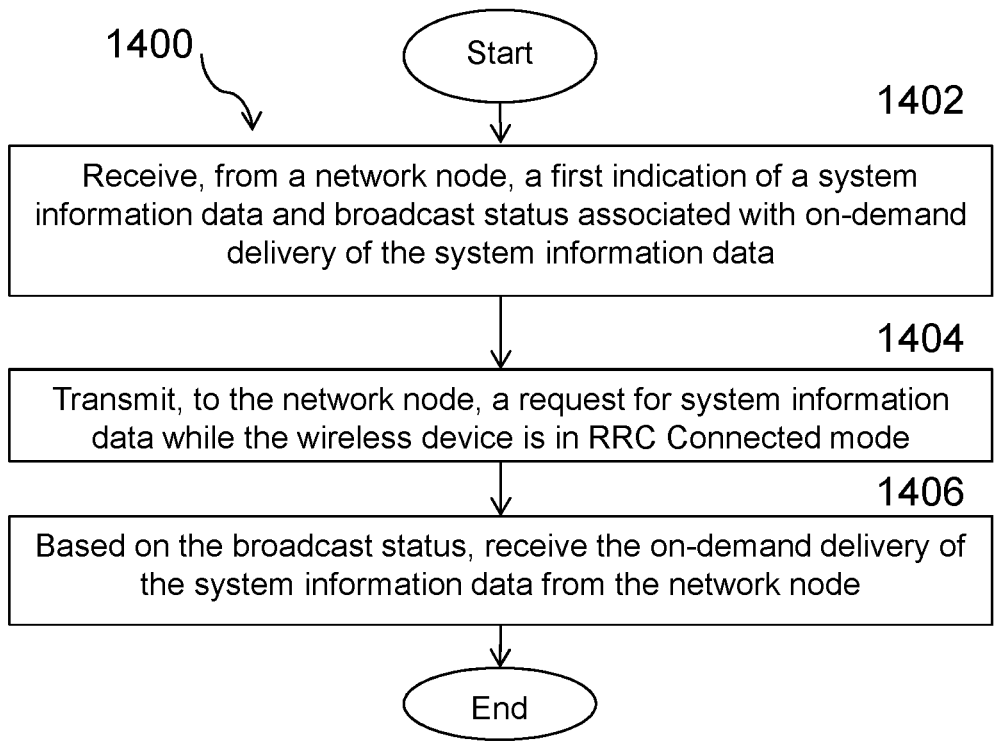
FIG. 16 illustrates another example method by a wireless device, according to certain embodiments.

FIG. 16 depicts a method 1400 by a wireless device 310, according to certain embodiments. At step 1402, the wireless device 310 receives, from a network node 360, a first indication of a system information data and broadcast status associated with on-demand delivery of the system information data. At step 1404, while in RRC Connected mode, the wireless device 310 transmits to the network node 360 a request for the system information data. Based on the broadcast status, the wireless device 310 receives the on-demand delivery of the system information data from the network node 360, at step 1406.

In a particular embodiment, the first indication of the broadcast status indicates that the network node prefers transmitting on-demand system information data by unicast.

In a particular embodiment, the system information data includes positioning assistance data.

In a particular embodiment, the first indication of the broadcast status indicates at least one of: broadcasting, not broadcasting, and unicast.

In a particular embodiment, the wireless device 310 receives a second indication of an updated broadcast status. The updated broadcast status is different than the first indication of the broadcast status.

In a particular embodiment, when transmitting the request for the system information data, the wireless device 310 initiates a RA procedure or MO-LR procedure.

In a particular embodiment, the step of receiving the on-demand delivery of the system information data from the network node 360 includes receiving system information via unicast by a SRB a RRCReconfiguration message. The request for the system information data is transmitted to the wireless device 310 using the MO-LR or RA procedure or RRC Resume procedure. For example, an RRC inactive wireless device may send a RRCResumeRequest and the on-demand delivery of the system information data from the network node 360 in response thereto.

In a particular embodiment, the request for the positioning assistance data is transmitted using a MO-LR message includes a bit string, and the bit string indicates at least one position system information block is requested.

In a particular embodiment, the wireless device 310 is operating in dual connectivity mode, the wireless device 310 selects at least one cell from a plurality of serving cells for receiving the on-demand delivery of the system information data.

In a particular embodiment, the at least one cell is selected based on what is currently being broadcasted in the plurality of cells or what is supported by the plurality of cells.

In a particular embodiment, upon handover from a source cell associated with the network node 360 to a target cell associated with a target network node, wireless device 310 transmits a request for the system information data to the target network node. The wireless device 310 then receives additional system information data from the target network node associated with the target cell.

In a particular embodiment, the request for the system information data is transmitted to the network node via RRC signaling. In a further particular embodiment, the request for the system information data is transmitted to the network node in a dedicated Uplink Radio Resource Control (UL RRC) message.

In a particular embodiment, the wireless device receives the on-demand delivery of the system information data from the network node 360 via RRC signaling. In a further particular embodiment, the system information data is received from the network node in an information element in an RRCReconfiguration message.

Figure 17:
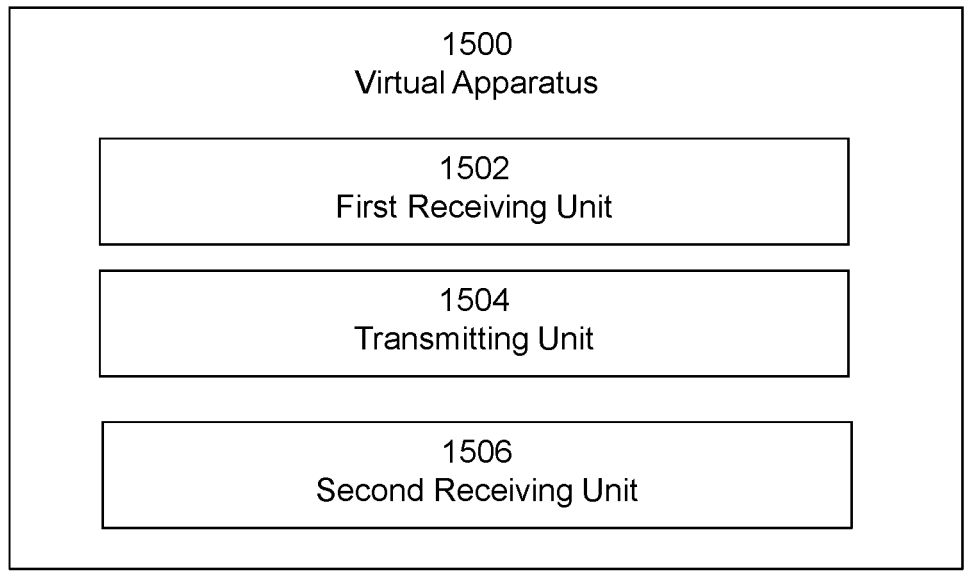
FIG. 17 illustrates another exemplary virtual computing device, according to certain embodiments.

FIG. 17 illustrates a schematic block diagram of a virtual apparatus 1500 in a wireless network (for example, the wireless network shown in FIG. 3). The apparatus may be implemented in a wireless device or network node (e.g., wireless device 310 or network node 360 shown in FIG. 3). Apparatus 1500 is operable to carry out the example method described with reference to FIG. 16 and possibly any other processes or methods disclosed herein. It is also to be understood that the method of FIG. 16 is not necessarily carried out solely by apparatus 1500. At least some operations of the method can be performed by one or more other entities.

Virtual Apparatus 1500 may comprise processing circuitry, which may include one or more microprocessor or microcontrollers, as well as other digital hardware, which may include digital signal processors (DSPs), special-purpose digital logic, and the like. The processing circuitry may be configured to execute program code stored in memory, which may include one or several types of memory such as read-only memory (ROM), random-access memory, cache memory, flash memory devices, optical storage devices, etc. Program code stored in memory includes program instructions for executing one or more telecommunications and/or data communications protocols as well as instructions for carrying out one or more of the techniques described herein, in several embodiments. In some implementations, the processing circuitry may be used to cause first receiving module 1510, transmitting module 1520, second receiving module 1530, and any other suitable units of apparatus 1500 to perform corresponding functions according one or more embodiments of the present disclosure.

According to certain embodiments, first receiving module 1510 may perform certain of the receiving functions of the apparatus 1500. For example, first receiving module 1510 may receive, from a network node, a first indication of a system information data and broadcast status associated with on-demand delivery of the system information data.

According to certain embodiments, transmitting module 1520 may perform certain of the transmitting functions of the apparatus 1500. For example, transmitting module 1520 may transmit, to the network node 360, a request for the system information data while the wireless device 310 is in RRC Connected mode.

According to certain embodiments, second receiving module 1530 may perform certain of the receiving functions of the apparatus 1500. For example, based on the broadcast status, second receiving module 1530 may receive the on-demand delivery of the system information data from the network node 360.

The term unit may have conventional meaning in the field of electronics, electrical devices and/or electronic devices and may include, for example, electrical and/or electronic circuitry, devices, modules, processors, memories, logic solid state and/or discrete devices, computer programs or instructions for carrying out respective tasks, procedures, computations, outputs, and/or displaying functions, and so on, as such as those that are described herein.

Figure 18:
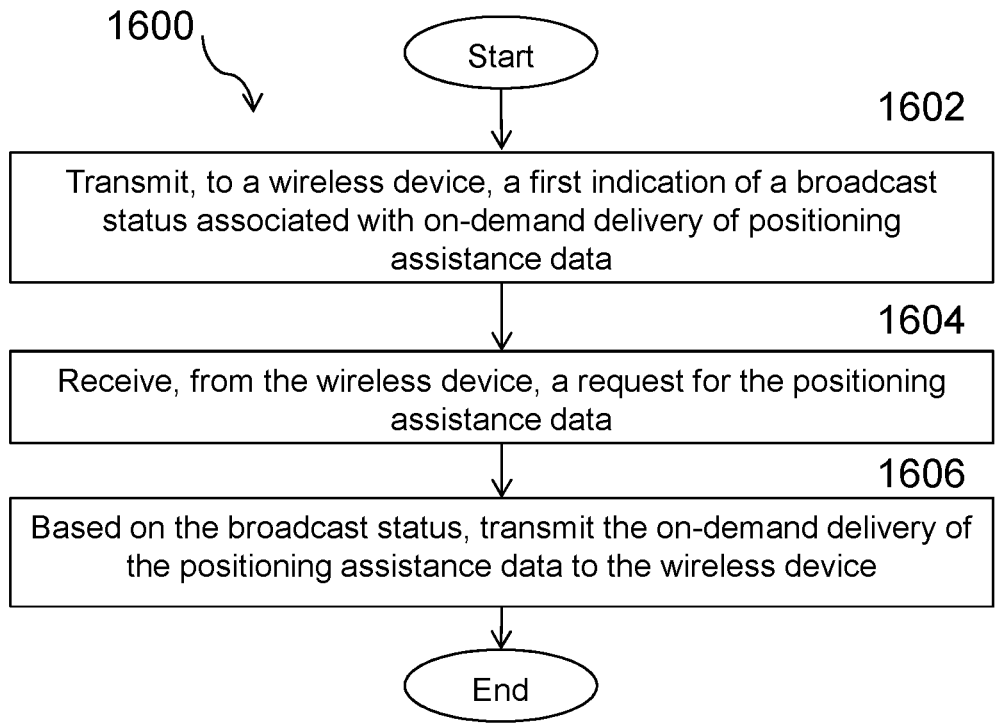
FIG. 18 illustrates an example method by a network node, according to certain embodiments.

FIG. 18 depicts a method 1600 by a network node, according to certain embodiments. At step 1602, the network node transmits, to a wireless device, a first indication of supported posSIB assistance data type and a broadcast status associated with on-demand delivery of positioning assistance data. The supported assistance data type and broadcast status may be defined using the same variable (parameter, Information Element, field) or different variables. At step 1604, the network node receives, from the wireless device, a request for the positioning assistance data. Based on the broadcast status, the network node transmits the on-demand delivery of the positioning assistance data to the wireless device at step 1606.

Figure 19:
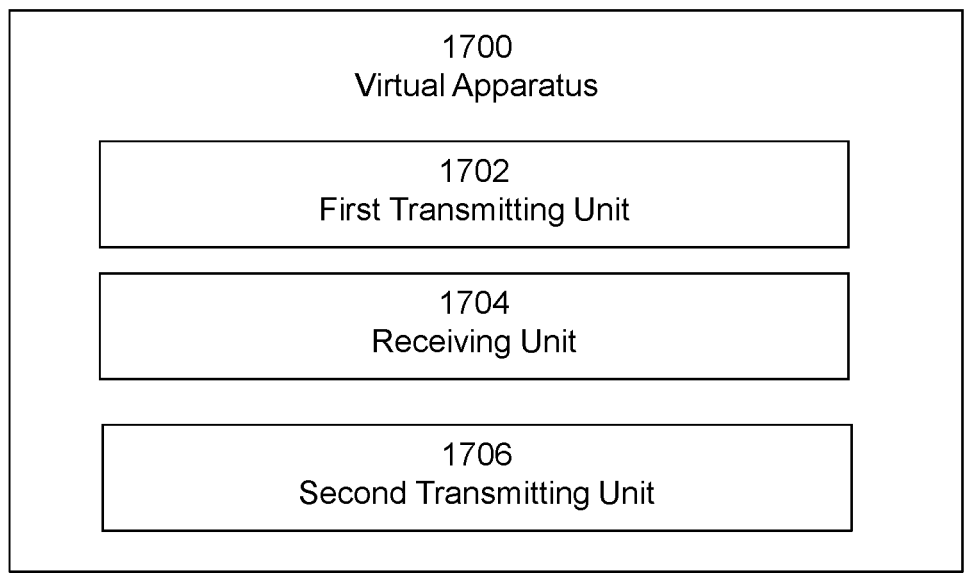
FIG. 19 illustrates another exemplary virtual computing device, according to certain embodiments.

FIG. 19 illustrates a schematic block diagram of a virtual apparatus 1700 in a wireless network (for example, the wireless network shown in FIG. 3). The apparatus may be implemented in a wireless device or network node (e.g., wireless device 310 or network node 360 shown in FIG. 3). Apparatus 1700 is operable to carry out the example method described with reference to FIG. 18 and possibly any other processes or methods disclosed herein. It is also to be understood that the method of FIG. 18 is not necessarily carried out solely by apparatus 1700. At least some operations of the method can be performed by one or more other entities.

Virtual Apparatus 1700 may comprise processing circuitry, which may include one or more microprocessor or microcontrollers, as well as other digital hardware, which may include digital signal processors (DSPs), special-purpose digital logic, and the like. The processing circuitry may be configured to execute program code stored in memory, which may include one or several types of memory such as read-only memory (ROM), random-access memory, cache memory, flash memory devices, optical storage devices, etc. Program code stored in memory includes program instructions for executing one or more telecommunications and/or data communications protocols as well as instructions for carrying out one or more of the techniques described herein, in several embodiments. In some implementations, the processing circuitry may be used to cause first transmitting module 1710, receiving module 1720, second transmitting module 1730, and any other suitable units of apparatus MOO to perform corresponding functions according one or more embodiments of the present disclosure.

According to certain embodiments, first transmitting module 1710 may perform certain of the transmitting functions of the apparatus 1700. For example, first transmitting module 1710 may transmit, to a wireless device, a first indication of a broadcast status associated with on-demand delivery of positioning assistance data.

According to certain embodiments, receiving module 1720 may perform certain of the receiving functions of the apparatus 1700. For example, receiving module 1720 may receive, from the wireless device, a request for the positioning assistance data.

According to certain embodiments, second transmitting module 1730 may perform certain of the transmitting functions of the apparatus 1700. For example, based on the broadcast status, second transmitting module 1730 may transmit the on-demand delivery of the positioning assistance data to the wireless device.

The term unit may have conventional meaning in the field of electronics, electrical devices and/or electronic devices and may include, for example, electrical and/or electronic circuitry, devices, modules, processors, memories, logic solid state and/or discrete devices, computer programs or instructions for carrying out respective tasks, procedures, computations, outputs, and/or displaying functions, and so on, as such as those that are described herein.

Figure 20:
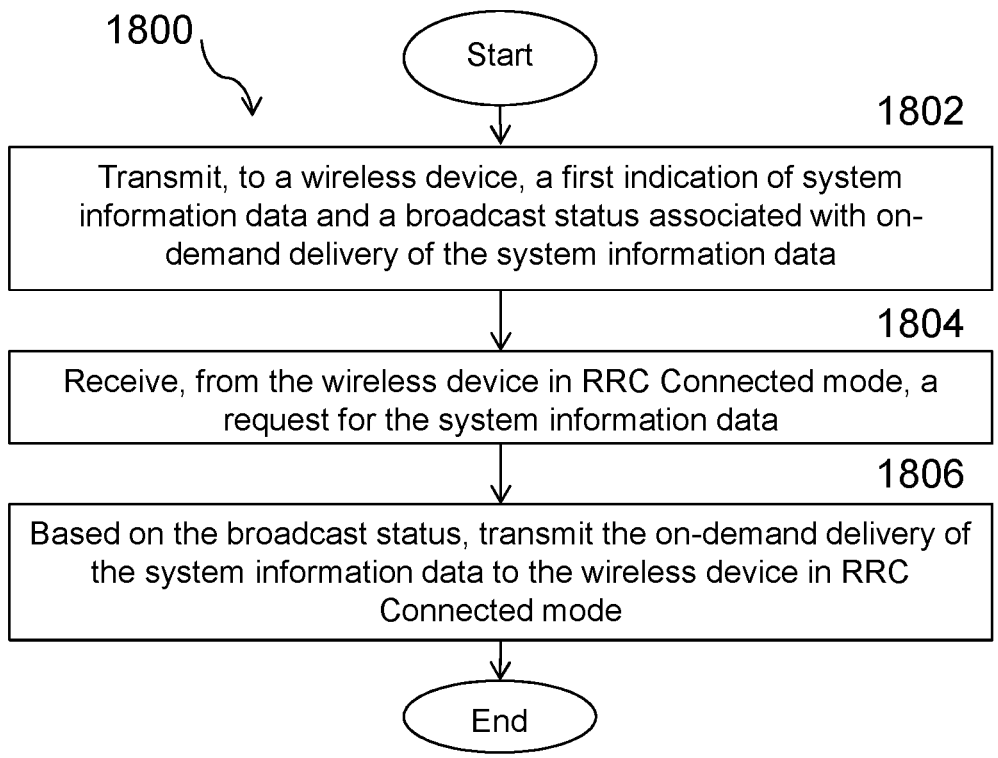
FIG. 20 illustrates another example method by a network node, according to certain embodiments.

FIG. 20 depicts a method 1800 by a network node 360, according to certain embodiments. At step 1802, the network node 360 transmits, to a wireless device 310, a first indication of system information data and a broadcast status associated with on-demand delivery of the system information data. At step 1804, the network node 360 receives, from the wireless device 310 in RRC Connected mode, a request for the supported system information data. Based on the broadcast status, the network node 360 transmits the on-demand delivery of the system information data to the wireless device 310 in the RRC Connected mode.

In a particular embodiment, the first indication of the broadcast status indicates the system information data type and that the network node 360 supports transmitting on-demand system information data by unicast.

In a particular embodiment, the system information data comprises positioning assistance data.

In a particular embodiment, the network node 360 receives, from the wireless device 310, a message indicating that the wireless device 310 supports receiving the system information data on-demand by unicast.

In a particular embodiment, the first indication of the broadcast status indicates at least one of: broadcasting, not broadcasting, and unicast.

In a particular embodiment, the network node 360 transmits a second indication of an updated broadcast status that is different than the first indication of the broadcast status.

In a particular embodiment, receiving the request for the system information data includes receiving a message initiating a RA procedure or a MO-LR procedure.

In a particular embodiment, the step of transmitting the on-demand delivery of the system information data to the wireless device 310 includes transmitting the system information data via unicast by a SRB, a RRCReconfiguration message, and the request for the system information data is received using the MO-LR or RA procedure.

In a particular embodiment, the request for the positioning assistance data is transmitted by the wireless device 310 using a MO-LR message comprising a bit string, and the bit string indicates at least one position system information block is requested.

In a particular embodiment, the request for the system information data is received by the network node 360 via RRC signaling. In a further particular embodiment, the request for the system information data is received by the network node in an Uplink Radio Resource Control (UL RRC) dedicated message.

In a particular embodiment, the network node 360 transmits the on-demand delivery of the system information data to the wireless device 310 via RRC signaling. In a further particular embodiment, the system information data is transmitted to the wireless device in an information element in an RRCReconfiguration message.

In a particular embodiment, the network node 360 transmits the broadcast status to another network node.

In a particular embodiment, the network node 360 comprises a base station, and the network node 360 receives, from another network node operating as a location server, a listing of at least one of a plurality of types of the system information data that are available for delivery via unicast. In a further particular embodiment, the network node 360 transmits the listing of the at least one of the plurality of types of the system information data that are available for delivery via unicast to the wireless device 310.

In a particular embodiment, the network node 360 includes a location server.

In a particular embodiment, during a handover operation from a source cell associated with the network node 360 to a target cell associated with a target network node, the network node 360 transmits broadcast status information to the target network node. In a further particular embodiment, the broadcast status information includes a capability or configuration of the wireless device 310 to support on-demand delivery of positioning assistance data via unicast.

In a particular embodiment, the network node 360 determines a number of wireless devices 310 requiring positioning data, compares the number of wireless devices 310 requiring positioning data to a threshold, and determines the broadcast status based on the comparison.

Figure 21:
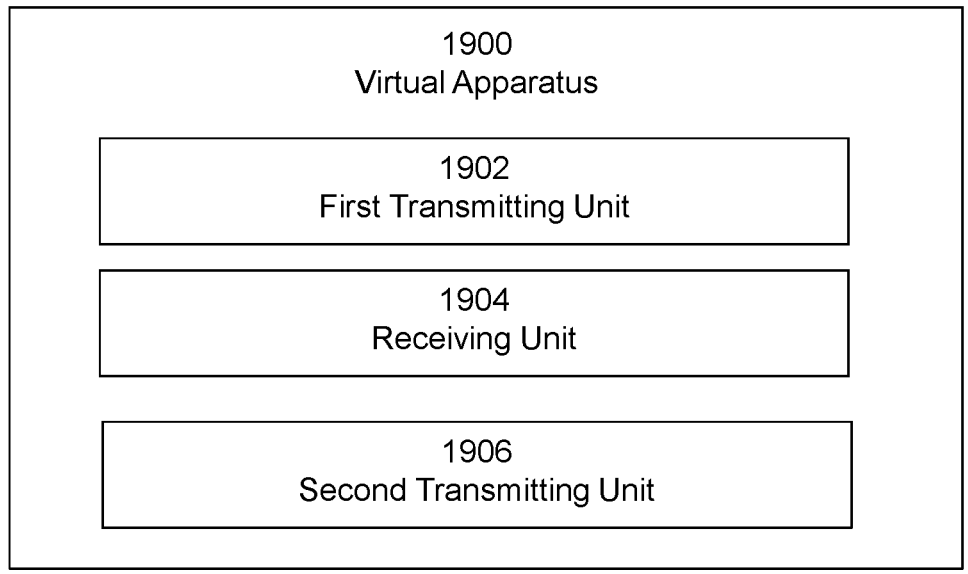
FIG. 21 illustrates another exemplary virtual computing device, according to certain embodiments.

FIG. 21 illustrates a schematic block diagram of a virtual apparatus 1900 in a wireless network (for example, the wireless network shown in FIG. 3). The apparatus may be implemented in a wireless device or network node (e.g., wireless device 310 or network node 360 shown in FIG. 3). Apparatus 1900 is operable to carry out the example method described with reference to FIG. 20 and possibly any other processes or methods disclosed herein. It is also to be understood that the method of FIG. 20 is not necessarily carried out solely by apparatus 1900. At least some operations of the method can be performed by one or more other entities.

Virtual Apparatus 1900 may comprise processing circuitry, which may include one or more microprocessor or microcontrollers, as well as other digital hardware, which may include digital signal processors (DSPs), special-purpose digital logic, and the like. The processing circuitry may be configured to execute program code stored in memory, which may include one or several types of memory such as read-only memory (ROM), random-access memory, cache memory, flash memory devices, optical storage devices, etc. Program code stored in memory includes program instructions for executing one or more telecommunications and/or data communications protocols as well as instructions for carrying out one or more of the techniques described herein, in several embodiments. In some implementations, the processing circuitry may be used to cause first transmitting module 1910, receiving module 1920, second transmitting module 1930, and any other suitable units of apparatus 1900 to perform corresponding functions according one or more embodiments of the present disclosure.

According to certain embodiments, first transmitting module 1910 may perform certain of the transmitting functions of the apparatus 1700. For example, first transmitting module 1910 may transmit, to a wireless device 310, a first indication of system information data and a broadcast status associated with on-demand delivery of the system information data.

According to certain embodiments, receiving module 1920 may perform certain of the receiving functions of the apparatus 1900. For example, receiving module 1920 may receive, from the wireless device 310 in RRC Connected mode, a request for the supported system information data.

According to certain embodiments, second transmitting module 1930 may perform certain of the transmitting functions of the apparatus 1900. For example, based on the broadcast status, second transmitting module 1930 may transmit the on-demand delivery of the system information data to the wireless device 310 in RRC Connected mode.

The term unit may have conventional meaning in the field of electronics, electrical devices and/or electronic devices and may include, for example, electrical and/or electronic circuitry, devices, modules, processors, memories, logic solid state and/or discrete devices, computer programs or instructions for carrying out respective tasks, procedures, computations, outputs, and/or displaying functions, and so on, as such as those that are described herein.

Example Embodiments

Example Embodiment 1. A method performed by a wireless device, the method comprising: receiving, from a network node, a first indication of a supported positioning assistance data type and broadcast status associated with on-demand delivery of positioning assistance data; transmitting, to the network node, a request for the positioning assistance data; and based on the broadcast status, receiving the on-demand delivery of the positioning assistance data from the network node.

Example Embodiment 2. The method of Embodiment 1, wherein the first indication of the broadcast status indicates that the network node supports transmitting on-demand positioning assistance data by unicast.

Example Embodiment 3. The method of Embodiment 1, further comprising identifying whether a certain positioning assistance data is supported by the Network node and obtained by means of unicast.

Example Embodiment 4. The method of Embodiment 1-3, wherein wireless device determines which posSIB type it can request based upon the current broadcast of positioning system information and upon the Network supported positioning assistance data type.

Example Embodiment 5. The method of Embodiment 2, further comprising transmitting, to the network node, a message indicating that the wireless device supports receiving on-demand positioning assistance data by unicast.

Example Embodiment 6. The method of any one of Embodiments 1 to 5, wherein the first indication of the broadcast status indicates at least one of: broadcasting, not broadcasting, and unicast.

Example Embodiment 7. The method of Embodiment 6, further comprising receiving a second indication of an updated broadcast status, the updated broadcast status being different than the first indication of the broadcast status.

Example Embodiment 8. The method of Embodiment 7, wherein the first indication of the broadcast status indicates unicast and wherein the second indication of the broadcast status indicates broadcasting.

Example Embodiment 9. The method of any one of Embodiments 1 to 8, wherein transmitting the request for the positioning assistance data comprises transmitting a message initiating random access procedure.

Example Embodiment 10. The method of any one of Embodiments 1 to 9, wherein transmitting the request for the positioning assistance data comprises sending a new msg3 message containing the BIT STRING or field with posSIB/posSI request than the legacy radio resource control (RRC) setup request.

Example Embodiment 11. The method of Embodiment 10, wherein the receiving the on-demand delivery of the positioning assistance data from the network node comprises receiving positioning assistance data via unicast by a signaling radio bearer (SRB).

Example Embodiment 12. The method of Embodiment 11, wherein the SRB is a low priority SRB.

Example Embodiment 13. The method of Embodiment 10, wherein receiving the on-demand delivery of the positioning assistance data from the network node comprises receiving a RRC connection setup/release/resume/reconfiguration message.

Example Embodiment 14. The method of any one of Embodiments 1 to 13, further comprising receiving a message indicating that the wireless device is to request the on-demand delivery of the positioning assistance data using a MO-LR or RRC procedure.

Example Embodiment 15. The method of Embodiment 14, wherein the request for the positioning assistance data is transmitting using the MO-LR or RRC procedure.

Example Embodiment 16. The method of Embodiment 15, wherein the message comprises a value, the value indicating whether on-demand delivery of positioning assistance data by unicast is supported by the RRC procedure or based upon the wireless device supported MO-LR/SUPL procedure.

Example Embodiment 17. The method of any one of embodiments 1 to 16, wherein the request for the positioning assistance data is transmitted using a MO-LR message comprising a bit string, the bit string indicating at least one position system information block is requested.

Example Embodiment 18. The method of any one of Embodiments 1 to 16, wherein the request for the positioning assistance data is transmitted using a positioning System Information-Request (pos SI-Request), the pos SI-Request comprising a bit string indicating a type of position system information block that is requested.

Example Embodiment 19. The method of Embodiment 17, further comprising receiving a mapping of a plurality of types of positioning assistance data to a respective one of a plurality of bit strings, each of the plurality of bit strings being associated with a type of position system information blocks.

Example Embodiment 20. The method of any one of Embodiments 1 to 16, wherein the request for the positioning assistance data is transmitted using a positioning System Information Broadcast Request (posSIB-Request). The posSIB-Request is a shortened version of Table 1 based upon only posSIBType which the Network supports or a generic type comprising MAC, FKP, SSR flags to minimize the number of bits.

Example Embodiment 21. The method of any one of Embodiments 1 to 20, wherein the broadcast status is active for a duration, the method further comprising that the broadcast status has expired after expiration of the duration.

Example Embodiment 22. The method of any one of Embodiments 1 to 21, wherein the wireless device is operating in dual connectivity mode, the method further comprising selecting at least one cell from a plurality of serving cells for receiving the on-demand delivery of the positioning assistance data.

Example Embodiment 23. The method of Embodiment 22, wherein the at least one cell is selected based on what is currently being broadcasted in the plurality of cells or what is supported by the plurality of cells.

Example The method of any one of Embodiments 1 to 23, wherein the wireless device is able to continue to receive the positioning assistance data upon handover to a different location (e.g., different cell, gNB).

Example Embodiment 25. The method of any one of Embodiments 1 to 24, wherein the wireless device is in an RRC connected state, and the positioning assistance data is requested via RRC signaling.

Example Embodiment 26. The method of Embodiment 25, wherein the positioning assistance data is received via RRC signaling.

Example Embodiment 27. A computer program comprising instructions which when executed on a computer perform any of the methods of embodiments 1 to 26.

Example Embodiment 28. A computer program product comprising computer program, the computer program comprising instructions which when executed on a computer perform any of the methods of embodiments 1 to 26.

Example Embodiment 29. A non-transitory computer readable medium storing instructions which when executed by a computer perform any of the methods of embodiments 1 to 26.

Example Embodiment 30. A wireless device comprising: a memory operable to store instructions; and processing circuitry operable to execute the instructions to cause the wireless device to perform any of Embodiments 1 to 26.

Example Embodiment 31. A method performed by a network node, the method comprising: transmitting, to a wireless device, a first indication of supported positioning assistance data type and a broadcast status associated with on-demand delivery of positioning assistance data; receiving, from the wireless device, a request for the positioning assistance data; and based on the broadcast status, transmitting the on-demand delivery of the positioning assistance data to the wireless device.

Example Embodiment 32. The method of Embodiment 31, wherein the first indication of the broadcast status indicates the supported positioning assistance data type and that the network node supports transmitting on-demand positioning assistance data by unicast.

Example Embodiment 33. The method of Embodiment 32, wherein the LMF provides the list of supported posSI- BType to Base Station (gNB) via NRPPa and Base Station provides to the UE using RRC.

Example Embodiment 34. The method of Embodiment 31, further comprising notifying the wireless device that a certain positioning assistance data is to be received by means of unicast.

Example Embodiment 35. The method of any one of Embodiments 31 to 34, further comprising receiving, from the wireless device, a message indicating that the wireless device supports receiving on-demand positioning assistance data by unicast.

Example Embodiment 36. The method of any one of Embodiments 31 to 35, wherein the first indication of the broadcast status indicates at least one of: broadcasting, not broadcasting, and unicast.

Example Embodiment 37. The method of Embodiment 36, further comprising transmitting a second indication of an updated broadcast status, the updated broadcast status being different than the first indication of the broadcast status.

Example Embodiment 38. The method of Embodiment 37, wherein the first indication of the broadcast status indicates unicast and wherein the second indication of the broadcast status indicates broadcasting.

Example Embodiment 39. The method of Embodiment 38, where is the broadcast status is expressed as an ENUMERATED field or BIT STRING.

Example Embodiment 40. The method of any one of Embodiments 31 to 39, wherein receiving the request for the positioning assistance data comprises receiving a message initiating random access procedure.

Example Embodiment 41. The method of any one of Embodiments 31 to 40, wherein receiving the request for the positioning assistance data comprises receiving a new msg3 containing the BIT STRING or field with posSIB/posSI request different than the legacy radio resource control (RRC) setup request.

Example Embodiment 42. The method of Embodiment 41, wherein the transmitting the on-demand delivery of the positioning assistance data to the wireless device comprises transmitting positioning assistance data via unicast by a signaling radio bearer (SRB).

Example Embodiment 43. The method of Embodiment 42, wherein the SRB is a low priority SRB.

Example Embodiment 44. The method of Embodiment 41, wherein transmitting the on-demand delivery of the positioning assistance data from the network node comprises transmitting a RRC connection setup/release/resume/reconfiguration message.

Example Embodiment 45. The method of any one of Embodiments 31 to 43 further comprising transmitting a message indicating that the wireless device is to request the on-demand delivery of the positioning assistance data using a MO-LR or RRC procedure.

Example Embodiment 46. The method of Embodiment 45, wherein the request for the positioning assistance data is received using the MO-LR or RRC procedure.

Example Embodiment 47. The method of Embodiment 45, wherein the message comprises a value, the value indicating whether on-demand delivery of positioning assistance data by unicast is supported by the RRC procedure or the UE supported MO-LR/SUPL procedure.

Example Embodiment 48. The method of any one of Embodiments 29 to 44, wherein the request for the positioning assistance data is transmitted by the wireless device using a MO-LR message comprising a bit string, the bit string indicating at least one position system information block is requested.

Example Embodiment 49. The method of any one of Embodiments 29 to 44, wherein the request for the positioning assistance data is transmitted by the wireless device using a positioning System Information-Request (pos SI-Request), the pos SI-Request comprising a bit string indicating a type of position system information block that is requested.

Example Embodiment 50. The method of Embodiment 46, further comprising transmitting, to the wireless device, a mapping of a plurality of types of positioning assistance data to a respective one of a plurality of bit strings, each of the plurality of bit strings being associated with a type of position system information blocks.

Example Embodiment 51. The method of any one of Embodiments 31 to 50, wherein the broadcast status is expires after a duration.

Example Embodiment 52. The method of Embodiments 31 to 51, further comprising determining the broadcast status based on at least one factor.

Example Embodiment 53. The method of Embodiment 52, wherein the at least one factor comprises a data update rate, a number of wireless devices using a service, and/or a security protection need.

Example Embodiment 54. The method of any one of Embodiments 31 to 53, further comprising transmitting the broadcast status to another network node.

Example Embodiment 55. The method of any one of Embodiments 31 to 53, wherein the network node comprises a base station.

Example Embodiment 56. The method of Embodiment 55, further comprising receiving, from another network node operating as a location server, a listing of at least one of a plurality of types of positioning assistance data that are available for delivery via unicast.

Example Embodiment 57. The method of Embodiment 56, further comprising transmitting the listing to the wireless device.

Example Embodiment 58. The method of any one of Embodiments 31 to 54, wherein the network node comprises a location server.

Example Embodiment 59. The method of any one of Embodiments 31 to 58, during a handover operation from a source cell associated with the network node to a target cell associated with a target node, the method further comprising: transmitting broadcast status information to the target node.

Example Embodiment 60. The method of Embodiment 59, wherein the broadcast status information comprises a capability or configuration of the wireless device to support on-demand delivery of positioning assistance data via unicast.

Example Embodiment 61. The method of any one of Embodiments 31 to 60, further comprising determining a number of wireless devices requiring positioning data, comparing the number of wireless devices requiring positioning data to a threshold, and determining the broadcast status based on the comparison.

Example Embodiment 62. A computer program comprising instructions which when executed on a computer perform any of the methods of embodiments 31 to 62.

Example Embodiment 63. A computer program product comprising computer program, the computer program comprising instructions which when executed on a computer perform any of the methods of embodiments 31 to 62.

Example Embodiment 64. A non-transitory computer readable medium storing instructions which when executed by a computer perform any of the methods of embodiments 31 to 62.

Example Embodiment 65. A network node comprising: a memory operable to store instructions; and processing circuitry operable to execute the instructions to cause the wireless device to perform any of embodiments 31 to 62.

Modifications, additions, or omissions may be made to the systems and apparatuses described herein without departing from the scope of the disclosure. The components of the systems and apparatuses may be integrated or separated. Moreover, the operations of the systems and apparatuses may be performed by more, fewer, or other components. Additionally, operations of the systems and apparatuses may be performed using any suitable logic comprising software, hardware, and/or other logic. As used in this document, "each" refers to each member of a set or each member of a subset of a set.

Modifications, additions, or omissions may be made to the methods described herein without departing from the scope of the disclosure. The methods may include more, fewer, or other steps. Additionally, steps may be performed in any suitable order.

Although this disclosure has been described in terms of certain embodiments, alterations and permutations of the embodiments will be apparent to those skilled in the art. Accordingly, the above description of the embodiments does not constrain this disclosure. Other changes, substitutions, and alterations are possible without departing from the spirit and scope of this disclosure.

The invention claimed is:

1. A method by a wireless device comprises:
   receiving, from a network node, a first indication of a system information data and broadcast status associated with on-demand delivery of the system information data, the first indication of the broadcast status indicating that the network node will transmit on-demand system information data by one of unicast and broadcast based at least in part upon a threshold number of wireless devices requiring position data content;
   transmitting, to the network node, a request for the system information data while the wireless device is in Radio Resource Control, RRC, Connected Mode, transmitting the request for the system information data comprising initiating a Mobile Originating Location Request, MO-LR, procedure, the request for the system information data being transmitted using a MO-LR message comprising a bit string, the bit string indicating at least one type of position system information block requested by the wireless device; and
   based on the broadcast status, receiving the on-demand delivery of the system information data from the network node.

2. The method of claim 1, wherein the system information data comprises positioning assistance data.

3. The method of claim 1, wherein the first indication of the broadcast status indicates at least one of: broadcasting, not broadcasting, and unicast.

4. The method of claim 3, further comprising receiving a second indication of an updated broadcast status, the updated broadcast status being different than the first indication of the broadcast status.

5. The method of claim 1, wherein the receiving the on-demand delivery of the system information data from the network node comprises receiving system information via unicast by a signaling radio bearer, SRB, a RRCReconfiguration message, and wherein the request for the system information data is transmitted using the MO-LR or RA procedure or RRC Resume procedure.

6. The method of claim 1, wherein the wireless device is operating in dual connectivity mode, the method further comprising selecting at least one cell from a plurality of serving cells for receiving the on-demand delivery of the system information data.

7. The method of claim 6, wherein the at least one cell is selected based on what is currently being broadcasted in the plurality of cells or what is supported by the plurality of cells.

8. The method of claim 1, wherein the method further comprises:
   upon handover from a source cell associated with the network node to a target cell associated with a target network node, transmitting a request for the system information data to the target network node, and
   receiving, from the target network node associated with the target cell, additional system information data.

9. The method of claim 1, wherein the request for the system information data is transmitted to the network node via RRC signaling.

10. The method of claim 9, wherein the request for the system information data is transmitted to the network node in a dedicated Uplink Radio Resource Control, UL RRC, message.

11. The method of claim 1, wherein receiving the on-demand delivery of the system information data from the network node comprises receiving the system information data via RRC signaling.

12. The method of claim 11, wherein the system information data is received from the network node in an information element in an RRCReconfiguration message.

13. A wireless device comprising:
   a memory operable to store instructions; and
   processing circuitry operable to execute the instructions to cause the wireless device to:
   receive, from a network node, a first indication of a system information data and broadcast status associated with on-demand delivery of the system information data, the first indication of the broadcast status indicating that the network node will transmit on-demand system information data by one of unicast and broadcast based at least in part upon a threshold number of wireless devices requiring position data content;
   transmit, to the network node, a request for the system information data while the wireless device is in Radio Resource Control, RRC, Connected Mode, transmitting the request for the system information data comprising initiating a Mobile Originating Location Request, MO-LR, procedure, the request for the system information data being transmitted using a MO-LR message comprising a bit string, the bit string indicating at least one type of position system information block requested by the wireless device; and
   based on the broadcast status, receive the on-demand delivery of the system information data from the network node.

14. A method by a network node comprises:
   transmitting, to a wireless device a first indication of system information data and a broadcast status associated with on-demand delivery of the system information data the first indication of the broadcast status indicating the system information data type and that the network node supports transmitting on-demand system information data by one of unicast and broadcast based at least in part upon a threshold number of wireless devices requiring position data content;

receiving, from the wireless device, a request for the system information data while the wireless device is in Radio Resource Control, RRC, Connected Mode, receiving the request for the system information data comprising receiving a message initiating a Mobile Originating Location Request, MO-LR, procedure, the request for the system information data being transmitted by the wireless device using a MO-LR message comprising a bit string, the bit string indicating at least one type of position system information block requested by the wireless device; and based on the broadcast status, transmitting the on-demand delivery of the system information data to the wireless device in RRC Connected mode.

15. The method of claim 14, wherein the system information data comprises positioning assistance data.

16. The method of claim 14, further comprising receiving, from the wireless device, a message indicating that the wireless device supports receiving the system information data on-demand by unicast.

17. The method of claim 14, wherein the first indication of the broadcast status indicates at least one of: broadcasting, not broadcasting, and unicast.

18. The method of claim 17, further comprising transmitting a second indication of an updated broadcast status, the updated broadcast status being different than the first indication of the broadcast status.

19. The method of claim 14, wherein transmitting the on-demand delivery of the system information data to the wireless device comprises transmitting the system information data via unicast by a signaling radio bearer, SRB, a RRCReconfiguration message, and wherein the request for the system information data is received using the MO-LR or RA procedure.

20. A network node comprising:
a memory operable to store instructions; and
processing circuitry operable to:
transmit, to a wireless device in Radio Resource Control, RRC, Connected mode, a first indication of system information data and a broadcast status associated with on-demand delivery of the system information data, the first indication of the broadcast status indicating the system information data type and that the network node supports transmitting on-demand system information data by one of unicast and broadcast based at least in part upon a threshold number of wireless devices requiring position data content;

receive, from the wireless device, a request for the supported system information data while the wireless device is in Radio Resource Control, RRC, Connected Mode, receiving the request for the supported system information data comprising receiving a message initiating a Mobile Originating Location Request, MO-LR, procedure, the request for the system information data being transmitted by the wireless device using a MO-LR message comprising a bit string, the bit string indicating at least one type of position system information block requested by the wireless device; and based on the broadcast status, transmit the on-demand delivery of the system information data to the wireless device in RRC Connected Mode.

* * * * *